United States Patent [19]

Nishida et al.

[11] Patent Number: 6,005,545
[45] Date of Patent: Dec. 21, 1999

[54] IMAGE PROCESSING METHOD AND ELECTRONIC DEVICE

[75] Inventors: Takashi Nishida; Kenji Sato, both of Tokyo, Japan

[73] Assignee: Sega Enterprise, Ltd., Tokyo, Japan

[21] Appl. No.: 08/714,153

[22] PCT Filed: Dec. 14, 1995

[86] PCT No.: PCT/JP95/02570

§ 371 Date: Apr. 3, 1997

§ 102(e) Date: Apr. 3, 1997

[87] PCT Pub. No.: WO96/22580

PCT Pub. Date: Jul. 25, 1996

[30] Foreign Application Priority Data

Jan. 17, 1995 [JP] Japan ................................ 7-005317

[51] Int. Cl.$^6$ .................................................. G09G 5/02
[52] U.S. Cl. .................... 345/150; 345/173; 345/473; 345/474; 345/475; 84/620
[58] Field of Search ........................... 345/150, 156, 345/168, 173, 179, 473–475, 438, 113–114, 133, 139; 84/620

[56] References Cited

U.S. PATENT DOCUMENTS

| | | | |
|---|---|---|---|
| 4,288,537 | 9/1981 | Knetzger | 434/169 |
| 4,451,985 | 6/1984 | Pullman | 33/18 R |
| 4,740,161 | 4/1988 | Schwartz et al. | 434/162 |
| 5,087,043 | 2/1992 | Billings et al. | 273/157 |
| 5,159,140 | 10/1992 | Kimpara et al. | 84/600 |
| 5,209,665 | 5/1993 | Billings et al. | 434/169 |
| 5,604,517 | 2/1997 | Filo | 345/173 |
| 5,796,388 | 8/1998 | Yasuhara et al. | 345/168 |

FOREIGN PATENT DOCUMENTS

| | | |
|---|---|---|
| 0 414 566 | 8/1990 | European Pat. Off. . |
| 0 663 658 | 1/1995 | European Pat. Off. . |
| 64-91174 | 4/1989 | Japan . |
| 4-14084 | 1/1992 | Japan . |
| 6318074 | 11/1994 | Japan . |

OTHER PUBLICATIONS

A copy of the Supplementary Partial European Search Report issued by the European Patent Office for Application No. EP 95–94–0440.

Brunner et al., "Proof Animation: The General Purpose Animator", *Proceedings of the 1991 Winter Simulation Conference*, Phoenix, Arizona, Dec. 8–11, 1991.

*Primary Examiner*—Richard A. Hjerpe
*Assistant Examiner*—Henry N. Tran
*Attorney, Agent, or Firm*—Dickstein Shapiro Morin & Oshinsky LLP

[57] ABSTRACT

An electronic device draws pictures with a plurality of color on a monitor 90. A sound making processing unit 108 reads a color displayed at a position commanded by a touch pen 28 and makes sounds corresponding to the read color. A movable body drawing unit 106 generates a movable body corresponding to a color displayed on the monitor 90 and draws the movable body so as to move the same corresponding to the color. Image processing can be conducted on pictures drawn on the monitor screen by game players.

54 Claims, 31 Drawing Sheets

IMAGE PROCESSING METHOD AND ELECTRONIC DEVICE

TECHNICAL FIELD

The present invention relates to an image processing method and an electronic device for displaying an image on a monitor screen and conducting image processing, using the displayed image.

BACKGROUND ART

Home video game devices are very popular as an amusement because of a wide variety of recently developed amusing games. As one of such video game devices, infant video game devices mainly for infants have been developed.

As a conventional infant video game device is known a video game device using cartridges of picture book type software so as to interest infants to play the games. By commanding a picture book by a touch pen, a game display can be changed, and by commanding specific positions on game displays on the monitor screen by a touch pen, various games can be played. By tracing a tablet with a touch pen in such a manner as to draw pictures, pictures can be arbitrarily drawn on the monitor screen. A plurality of colors can be used, and various touch lines can be selectively used.

Thus the conventional infant video game device has the drawing function of a game player arbitrarily drawing pictures on the monitor screen, but the drawing function simply enables a game player to draw pictures on the monitor screen and erase them. The games can be played at first with interest but soon bore players because of the lack of game properties other than a simple drawing function.

An object of the present invention is to provide an image processing method and an electronic device for conducting image processing using pictures drawn on the monitor screen by a game player.

BEST MODES FOR CARRYING OUT THE INVENTION

Figure 1:
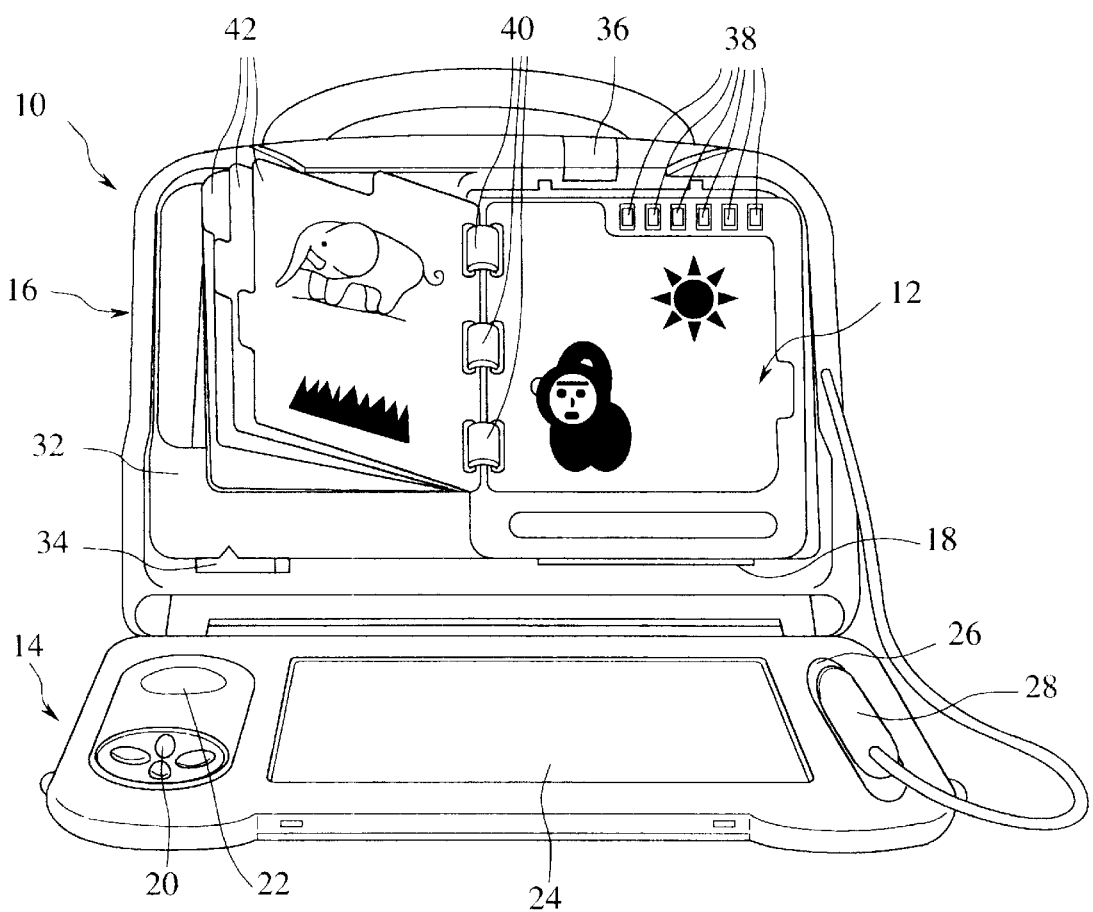
FIG. 1 is a perspective view of the video game device according to one embodiment of the present invention, which shows the appearance thereof.
Figure 2:
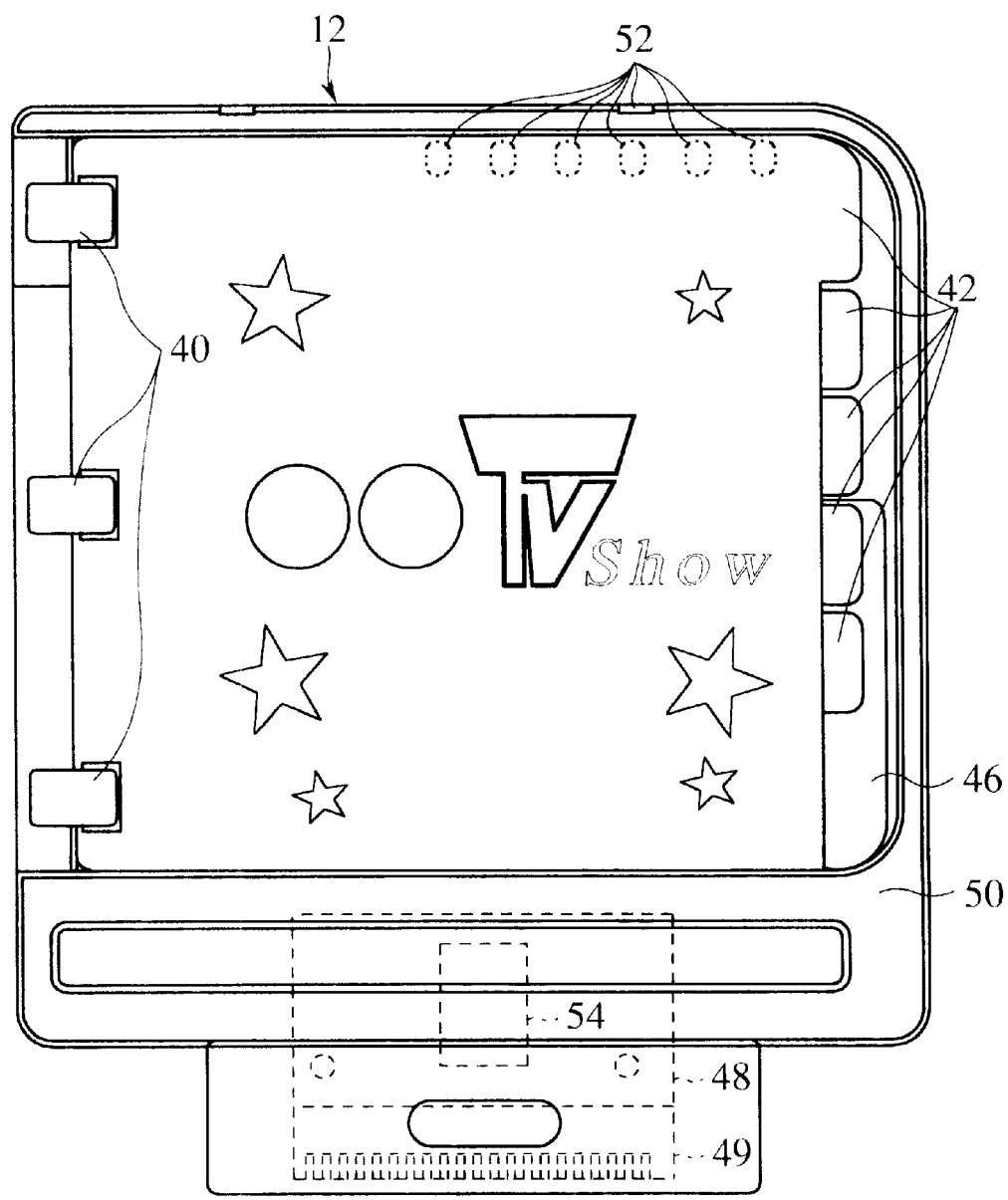
FIG. 2 is a view of a software cartridge of the video game device according to said one embodiment of the present invention.
Figure 3:
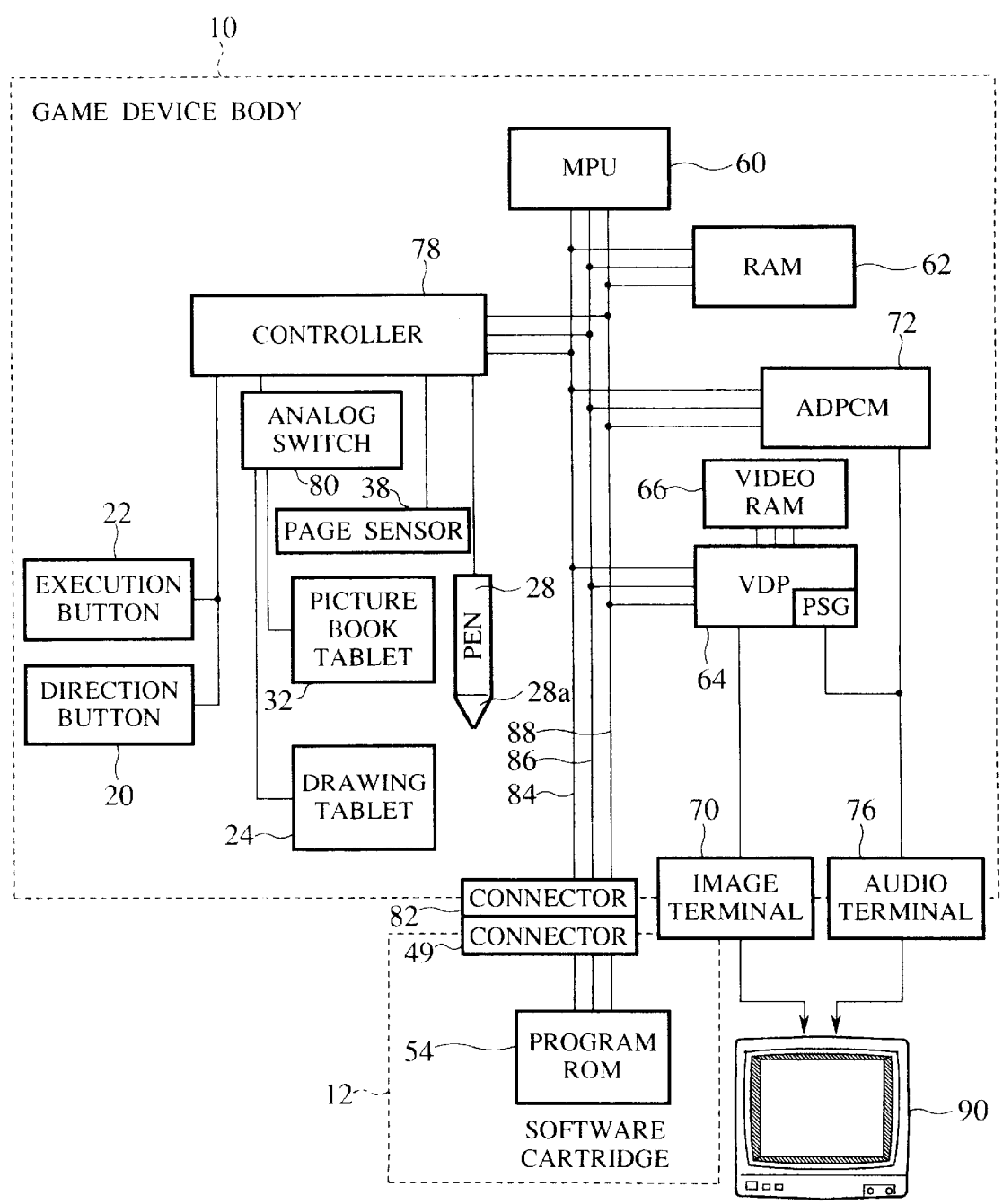
FIG. 3 is a block diagram of a structure of the hardware of the video game device according to said one embodiment of the present invention.
Figure 4:
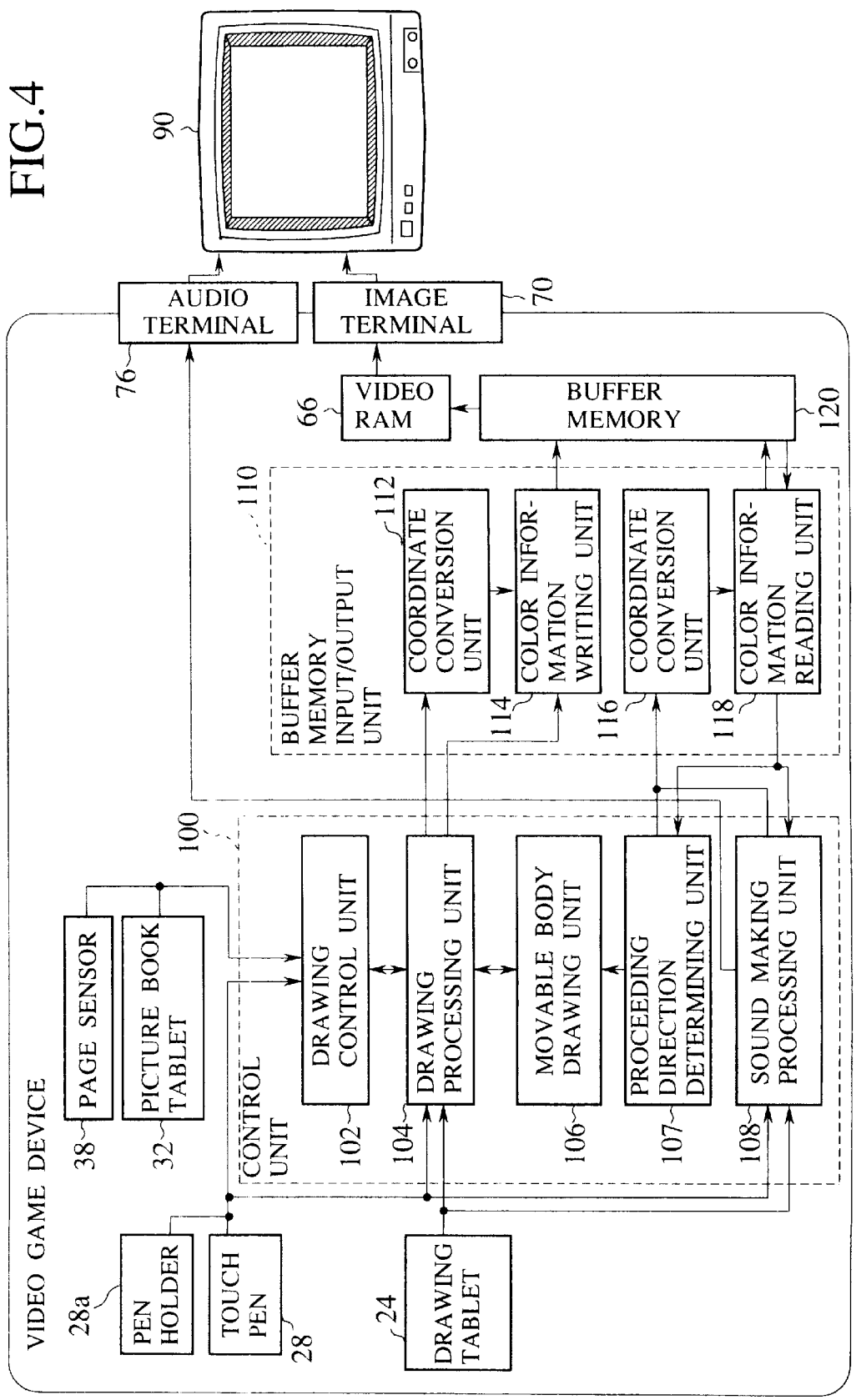
FIG. 4 is a block diagram of a function of the video game device according to said one embodiment of the present invention.

The video game device according to one embodiment of the present invention will be explained with reference to FIGS. 1 to 4. FIG. 1 is a perspective view of the video game device according to the present embodiment, which shows its appearance. FIG. 2 is a view of a software cartridge for use in the video game device according to the present embodiment. FIG. 3 is a block diagram of the hardware video game device according to the present embodiment. FIG. 4 is a block diagram of a function of the video game device according to the present embodiment.

(Game Device Body)

In the video game device according to the present embodiment, a software cartridge 12 of picture book type is inserted into a foldable game device body 10. As shown in FIG. 1, a top cover of the game device body 10 is unlocked from a bottom cover thereof to be opened, and a software cartridge 12 is inserted into a cartridge slot in the inside thereof.

On the inside of the bottom cover 14 of the game device body, a direction button 20 and an execution button is disposed on the left part thereof, a drawing tablet 24 is disposed on the central part thereof, and a touch pen holder 26 is disposed on the right part thereof.

The direction button 20 and the execution button 22 are operated by a game player. Four directions are commanded by the direction button 20, and an execution command is given by the execution button 22. The touch pen holder 26 holds a touch pen 28. The touch pen 28 is contacted to the tablet to operate the picture book software. A pen button 28a is disposed on the tip of the touch pen 28. The game player presses the pen button 28a to give commands.

The drawing table 24 detects, by an electromagnetic induction method, a position to which the touch pen 28 is approached. The touch pen 29 receives electromagnetic signals from the drawing touch pen 24 to detect a position. The game player gives commands based on the position by pressing the pen button 28a.

On the inside of the top cover 16 of the game device body 10, a picture book tablet 32 where a picture book-type software cartridge is mounted on is disposed on a central part thereof. The picture book table 32 detects, by an electromagnetic induction method, a position to which the touch pen 28 is approached.

A power switch 34 for turning on/off an electric power source is disposed below a lower left part of the picture book tablet 32. The cartridge slot 18 for a software cartridge to be inserted into is disposed below a lower right part of the picture book tablet 32. The loaded software cartridge 12 can be taken out through the cartridge slot 18 by pushing an ejection button 36.

Page sensors 38 are disposed on an upper right part of the picture book tablet 32. The page sensors 38 detect what page 42 of the picture book of the software cartridge 12 is opened. Cuts are formed in an upper right part of respective pages of the picture book, and the cuts have increased widths in accordance with increases of page number. Accordingly different numbers of the sensors are covered by opened pages, whereby a currently opened page can be detected.

As shown in FIG. 1, the software cartridge 12 has the basic form of a picture book of a plurality of bonded pages 42 by bonding rings 40 on the left edge. Pictures corresponding to a game program are drawn on the respective pages 42.

(Software Cartridge)

The software cartridge 12 will be explained with reference to FIG. 2. FIG. 2 is a plan view of the software cartridge 12 with respective pages 42 of a picture book closed.

The software cartridge 12 has the upper part in the form of a picture book mount 46 on which a picture book is mounted, and the lower part in the form of a circuit substrate housing unit 50 for housing a circuit substrate 48.

The bonding rings 40 are disposed on the left edge of the picture book mount 46 and bond the respective pages 42 of the picture book. In the present embodiment 5 pages 42 are bonded, and indexes are formed on the right edge of the respective pages, displaced from each other. Six sensor holes 52 are opened in the picture book tablet at positions corresponding to the page sensors 38.

The circuit substrate housing unit 50 houses the circuit substrate 48. The circuit substrate 48 has a connector 49 formed on for connection to the game device body 10 and has a program ROM 54 mounted on which stores a game program.

(Hardware)

A structure of the hardware of the video game device according to the present embodiment will be explained with reference to FIG. 3.

The game device body 10 will be explained. An MPU 60 generally controls the video game device. A RAM 62 is a work memory for the MPU 60. A video display processor (VDP) 64 controls drawing processing of drawing backgrounds, characters, etc. Image information is written in the video RAM 66. Image signals from the video display processor 64 are outputted to a monitor 90 from an image terminal 70.

An audio synthesizing LSI (ADPCM) 72 synthesizes all sounds and voices, such as words characters speak. Sounds and voices corresponding to a game are synthesized and spoken. Audio signals from the video display processor 64, and audio signals from the audio synthesizing LSI 172 are mixed and outputted to the monitor 90 through the audio terminal 76.

The controller 78 monitors states of the direction button 20, the execution button 22, the touch pen 28, the pen button 28a and the page sensor 38 and outputs to the MPU 60 input information inputted by the game player.

The controller 78 monitors states of the picture book tablet 32 and the drawing table 24 through an analog switch 80.

The MPU 60, the RAM 62, the video display processor 64, the audio synthesizing LSI 72, the controller 78 are interconnected with each other by an address bus 84, a data bus 86 and a control bus 88.

In the software cartridge 12, the program ROM 54 storing a game program is mounted on the circuit substrate 48. The software cartridge 12 is connected to the game device body 10 by connectors 49, 82, and the address bus 84, the data bus 86 and the control bus 88 are respectively connected to the soft cartridge 12. An electric power source line (not shown) is also connected to the software cartridge 12 by the connectors 49, 82.

(Operational Block Diagram)

Next, the operation of the video game device according to the present embodiment will be explained with reference to the block diagram of FIG. 4. FIG. 4 is the block diagram of the video game device which is in operation as a video game device with the software cartridge loaded in the game device body 10.

A control unit 100 controls drawing processing and sound making processing. A drawing control unit 102 controls a drawing processing unit 104 to draw a required picture, based on an approached position of the touch pen 28 to the picture book tablet 32. The drawing processing unit 104 writes line drawings in a buffer memory 120 through a buffer memory input/output unit 110. The drawing processing unit 104 controls writing required pictures in the buffer memory 120 and writing line drawings in the buffer memory 120, based on an approached position of the touch pen 28 to drawing tablet 24, and a movable body drawing unit 106 controls writing pictures of insects, animals, etc. in the buffer memory 120. The movable body drawing unit 106 draws pictures of movable bodies, such as insects, animals, etc., in a direction decided by a proceeding direction deciding unit 107. A sound making processing unit 108 conducts sound making processing, based on an approached position of the touch pen 28 to the drawing tablet 24 and color information from the buffer memory 120.

A buffer memory input/output unit 110 writes color information in the buffer memory 120 in response to drawing control by the control unit 100 and reads color information from the buffer memory 120 and outputs the same to the control unit 100.

In writing color information, a writing position supplied by the control unit 100 is converted to an address of the buffer memory 120 by a coordinate conversion unit 112, and the color information commanded by the control unit 100 is written in the address by a color information writing unit 114.

In reading color information, a reading position supplied by the control unit 100 is converted to an address of the buffer memory 120 by a coordinate conversion unit 116, and color information at the address of the buffer memory 120 is read by a color information reading unit 118 and outputs the same to the sound making processing unit 108 of the control unit 100.

Image information is written in the video RAM 66 in images for each frame based on color information stored in the buffer memory 120 and is outputted to the monitor 90 through the image terminal 70.

Audio information is outputted to the monitor 90 through the audio terminal 76 in audio signals outputted by the sound making processing unit 108.

(A First Example of the Video Game)

Then, a first example of the video game of the video game device according to the present embodiment will be explained with reference to FIGS. 5 to 20.

(Basic Drawing Processing)

The drawing processing according to the first example will be explained with reference to FIGS. 5 to 8.

Figure 5:
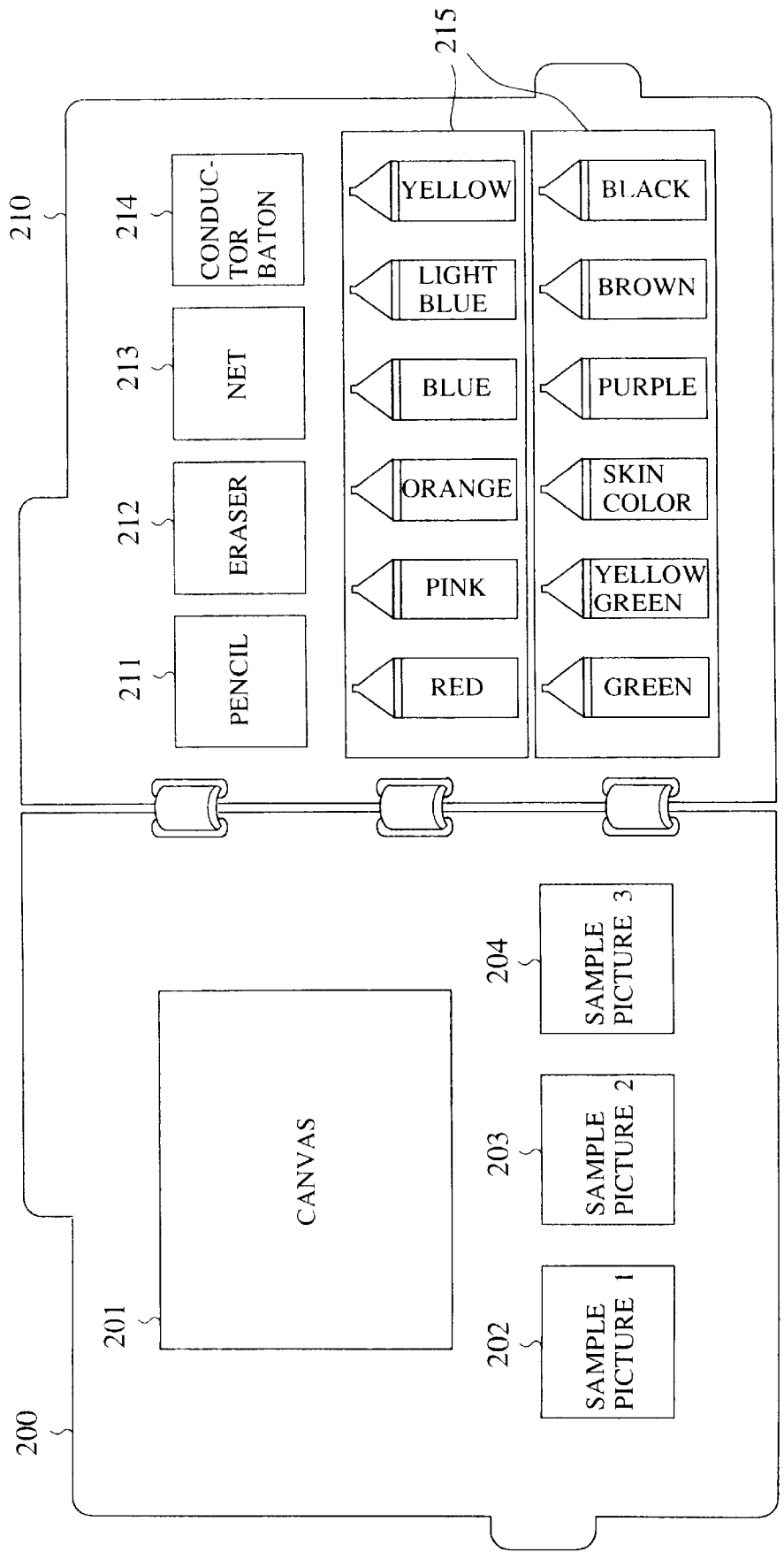
FIG. 5 is a view of one example of a picture book of the software cartridge according to a first example of the video game.

FIG. 5 shows an example of pictures of the software cartridge 12 used in the drawing processing of the drawing processing according to the present example. When the touch pen 28 approaches a part of a picture in FIG. 5, the picture book tablet 32 detects the approached position of the picture book tablet 32 to the touch pen 28, and then the pen button 28a is pressed to input a drawing command corresponding to the approached position.

On the left page 200 of the picture book tablet 32 of FIG. 5 there are arranged a canvas region 201, and a sample picture regions 202, 203, 204. When the canvas region 201 is touched by the touch pen 28, a canvas on which pictures can be freely drawn is displayed on the monitor 90. When the touch pen 28 touches the sample picture regions 202, 203, 204, prescribed sample pictures are displayed on the monitor 90.

On the right page 210 of the picture book tablet 32 of FIG. 5 there are arranged a pencil region 211, an eraser region 212, a net region 213, a conductor stick region 214 and a color command region 215. When the touch pen 28 touches the pencil region 211, the touch pen 28 functions as a pencil. Further a color of the pencil can be commanded by touching the touch pen 28 to the required color region in the color command region 215. When the touch pen 28 touches the eraser region 212, the touch pen 28 functions as a eraser. When the touch pen 28 touches the net region 213, the touch pen 28 functions as an insect net. When the touch pen 28 touches the conductor stick region 214, the touch pen 28 functions a conductor stick.

Figure 6:
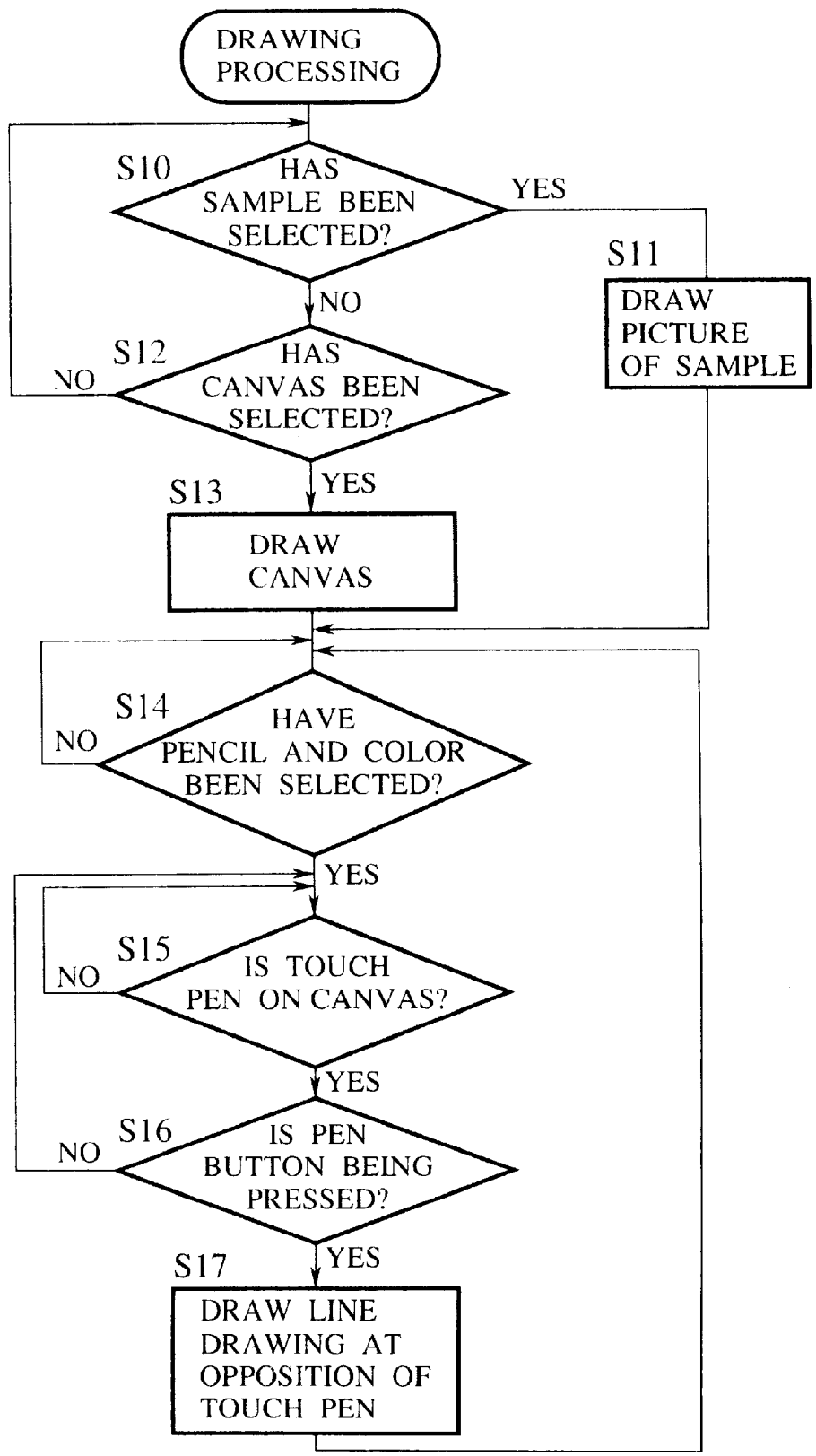
FIG. 6 is a flow chart of drawing processing of the first example of the video game.

The drawing processing will be explained with reference to the flow chart of FIG. 6.

Figure 7:
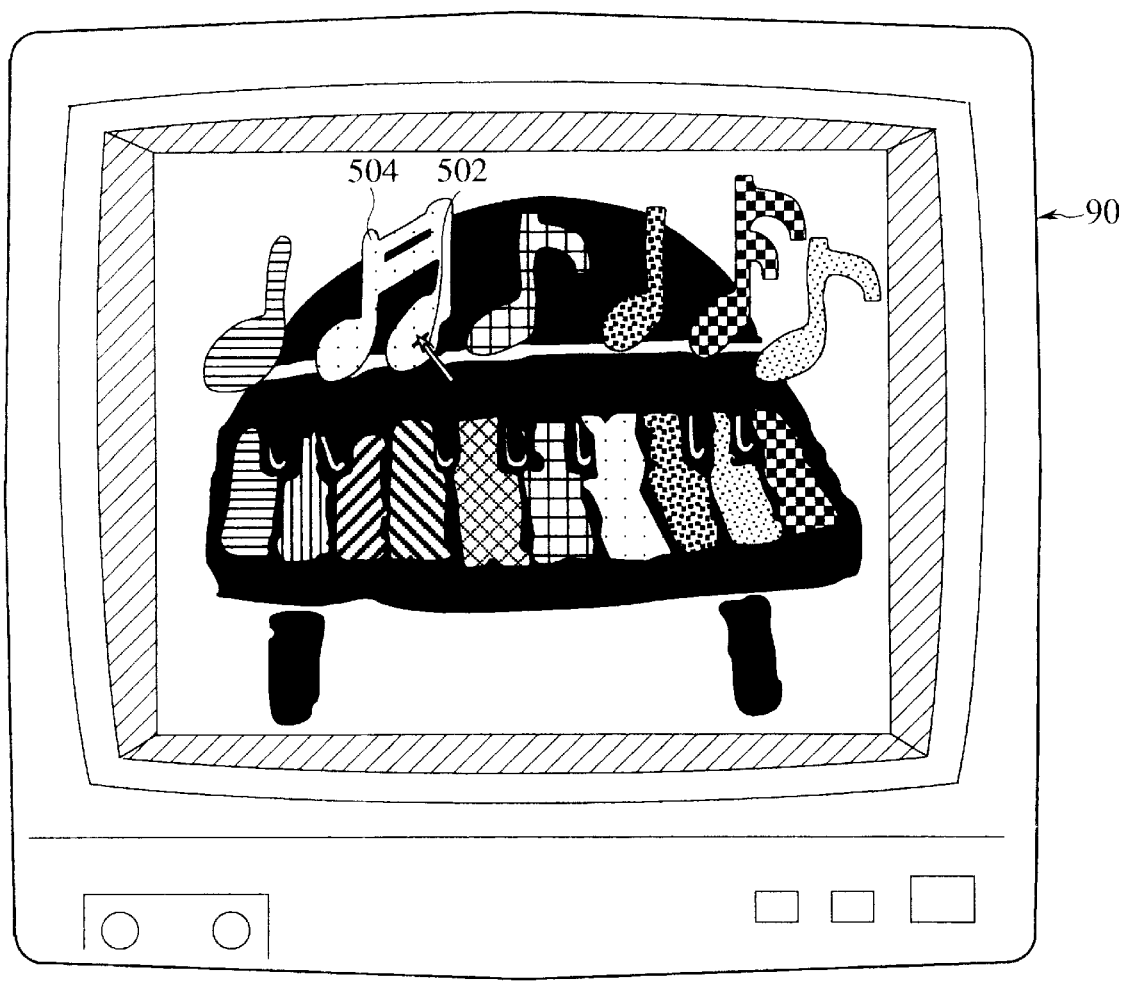
FIG. 7 is one example of sample pictures of the first example of the video game.

First, it is judged whether or not a sample picture has been selected by the touch pen 28 (step S10). When a game player contacts one of the sample regions 202, 203, 204 with the touch pen 28, the drawing control unit 012 controls the drawing processing unit 104 to draw the selected sample picture on the monitor 90 (step S11). FIG. 7 shows an example of the sample pictures. A grand piano is drawn.

When any of the sample pictures has been selected, it is judged whether or not the canvas has been selected with the touch pen 28 (step S12). When the game player contacts the touch pen 28 to the canvas region 201, the drawing control unit 102 controls the drawing processing unit 102 to draw the canvas on the monitor 90 (step S13). FIG. 7 shows an example of the canvas picture. First the canvas without any picture is drawn.

Then, line drawings are drawn with the pencil on the monitor 90. First, a case in which line drawings are drawn on the canvas of FIG. 8 will be explained, but it is possible to draw line drawings on the sample picture of FIG. 7.

First it is judged whether or not the pencil and a color have been selected by the touch pen 28 (step S14). When the touch pen 28 contacts the pencil region 211 and one of the color command region 215, the pencil 500 of a commanded color is displayed on the monitor 90.

Figure 8:
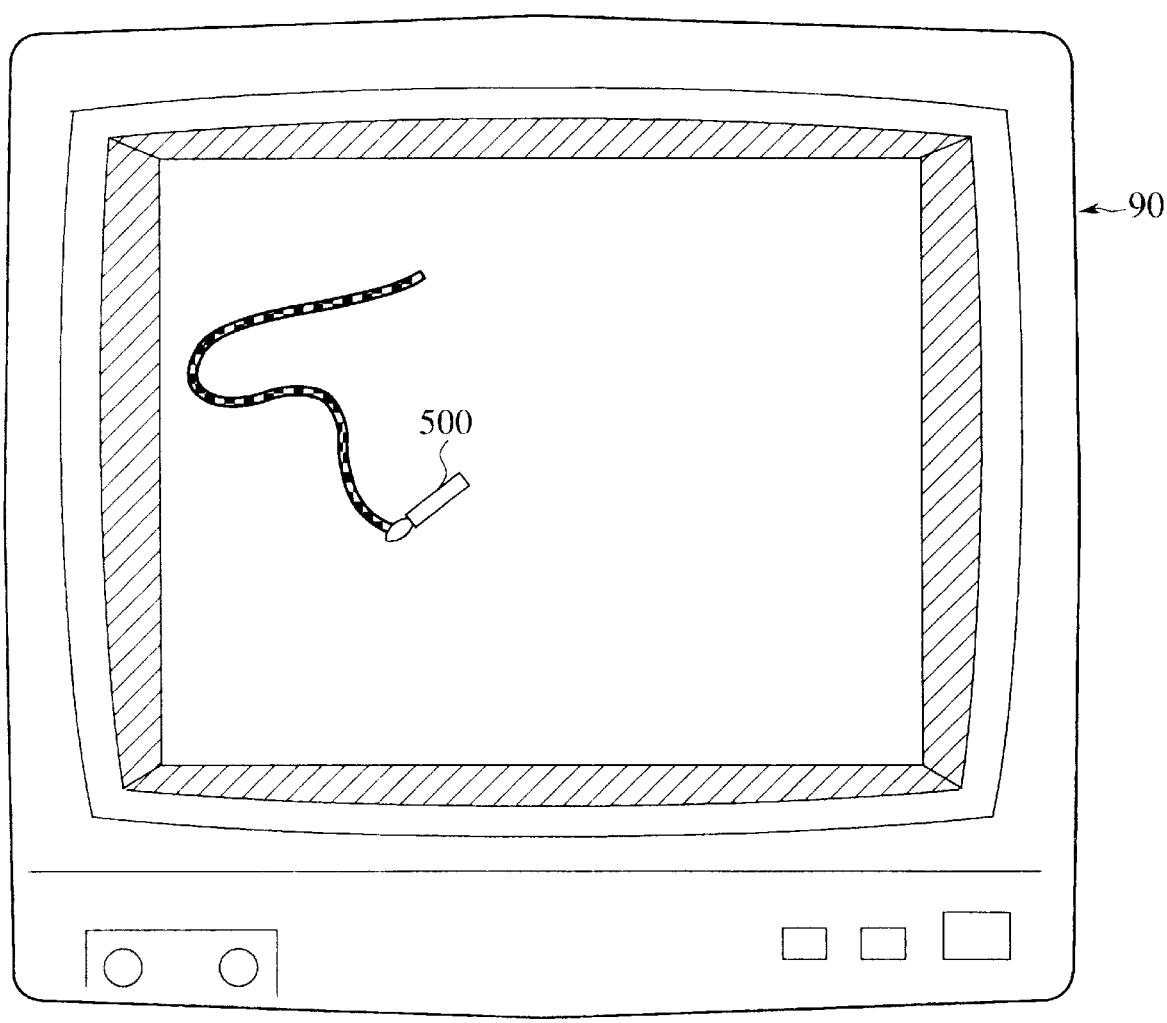
FIG. 8 is a view of one example of pictures on a canvas of the first example of the video game.

Then, it is judged whether or not the touch pen 28 is on the drawing tablet 24 (step S16). When the game player contacts the touch pen 28 to the drawing tablet 24, the drawing processing unit 104 outputs a position signal to the coordinate conversion unit 112, and a color signal is outputted to the color information writing unit 114. The coordinate conversion unit 112 the position signal to an address signal indicative of an address of the buffer memory 120. The color information writing unit 114 writes the color information indicated by the color signal in the converted address (step S17). When the game player moves the touch pen with the touch pen 28 in contact with the drawing tablet 24, as shown in FIG. 8, the pencil 500 moves on the monitor 90 in synchronization with the movement of the touch pen 28, and a line drawing of the selected color is drawn on the canvas.

When the touch pen 28 contacts the color command region 215, the color of the pencil 500 is changed, line drawings of a plurality of colors are drawn on the canvas of the monitor 90. The touch pen 28 contacts the eraser region 212 to display the eraser on the monitor 90, and then the touch pen 28 is moved, tracing the drawn line drawing on the canvas of the monitor 90, whereby the drawn line drawing can be erased. Thus pictures can be freely drawn on the canvas of the monitor 90 as pictures are drawn on an actual canvas.

(Sound Making Processing 1)

Figure 9:
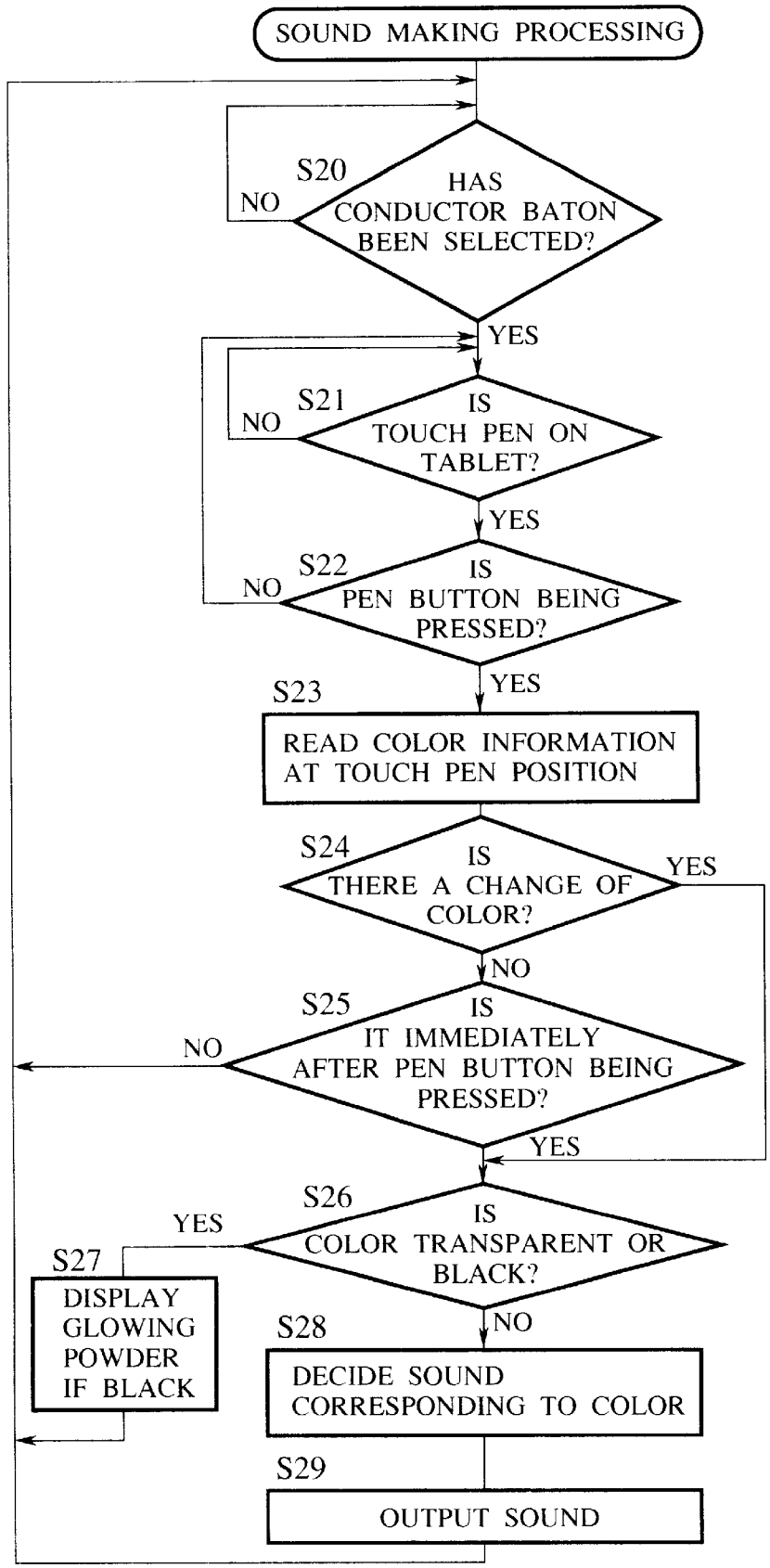
FIG. 9 is a flow chart of sound making processing of the first example of the video game.

The sound making processing according to the first example will be explained with reference to the flow chart of FIG. 9. The sound making processing will be explained by using the grand piano of a sample picture of FIG. 7, but the sound processing can be conducted by using the line drawing on the canvas shown in FIG. 8.

First, it is judged whether or not the touch pen 2 has selected the conductor baton 502, an indication body showing the sound making status of the game player (step S20). When a game player contacts the touch pen 28 to the conductor baton region 214, the conductor baton 502 is displayed on the monitor 90.

Then, it is judged whether or not the touch pen 28 is on the drawing tablet (step S21). Further it is judged whether the pen button 28a is being pressed (step S22). When the game player contacts the touch pen 28 to the drawing tablet 24, the sound making processing unit 108 outputs a position signal to the coordinate conversion unit 116, which converts the position signal to an address of the buffer memory 120. Subsequently the color information reading unit 118 reads a color signal at the converted address of the buffer memory 120, and outputs the color signal to the sound making process unit 108 (step S23).

Then, it is judged whether or not a change of the color information is present (step S24). In the absence of a change of the color information, it is judged whether or not it is immediately after the pen button 28a was pressed (step S25).

Unless it is immediately after the pen button 28a was pressed, the process is returned to Step S20.

When it is immediately after the pen button 28a being pressed, the sound making processing unit 108 judges whether the read color information is transparent or black (step S26). This is because no sounds are generated if the color information is transparent or black (step S26). When the selected color information is black, glowing powder is displayed (step S27), and the step is returned to Step S20.

Unless the read color information is transparent or black, the sound making processing unit 108 decides in accordance with the color information a sound to be made (step S28). A sound making frequency table which decides magnifications of frequencies of sounds corresponding to the respective color information, and based on the sound making frequency table a frequency magnification is decided. Subsequently the sound making processing unit 108 outputs a decided sound signal and outputs the same to the monitor 90 through the audio terminal 76 to make a sound (step S29).

In FIG. 7, the conductor baton 502 is positioned on a yellow note 504, and a sound preset for yellow, for example, B of the piano, is made.

By thus moving the touch pen 28 on the drawing tablet 24, and pressing the pen button 28a, sounds corresponding to commanded colors can be made.

Furthermore, as shown in FIG. 7, a picture is drawn in colors which correspond to the notes of the key board of the piano, and it is possible that simple music can be freely played by commanding keys of the piano with the conductor baton.

(Movable Body Drawing Processing 1)

The moving insect drawing processing for moving an insect according to the present example will be explained with reference to FIGS. 10 to 20.

In this moving insect drawing processing, an insect which likes one of colors used in a line drawing on the canvas is automatically displayed by the movable body drawing unit 106, and the inset is moved along the line drawing. A game player can play a game to catch an insect using an insect net, and other games.

(Basic Flow)

Figure 10:
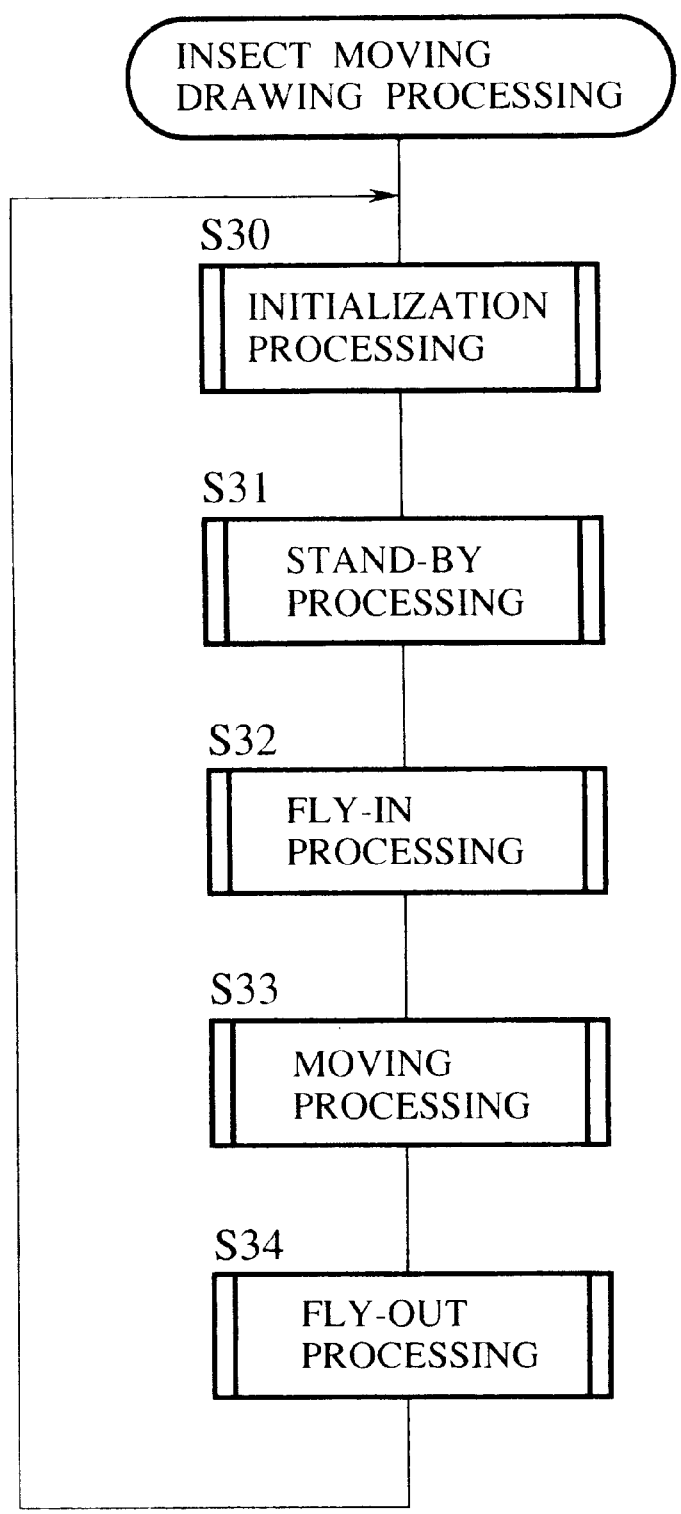
FIG. 10 is a flow chart of inset movement drawing processing of the first example of the video game.

FIG. 10 shows the basic flow chart of the moving insect drawing processing.

The basic flow of the moving insect drawing processing includes an initialization processing for initializing respective parameters (step S30), a stand-by processing for standing by until generation of an insect is commanded (step S31), a fly-in processing for flying the generated insect onto the screen (step S32), a movement processing for moving the insect on the screen (step S33), and a flying-out processing for flying the insect out of the screen (step S34). The drawing processing is conducted separately for each of a number of generated insects.

Each drawing processing will be sequentially detailed.

(Initialization Processing)

Figure 11:
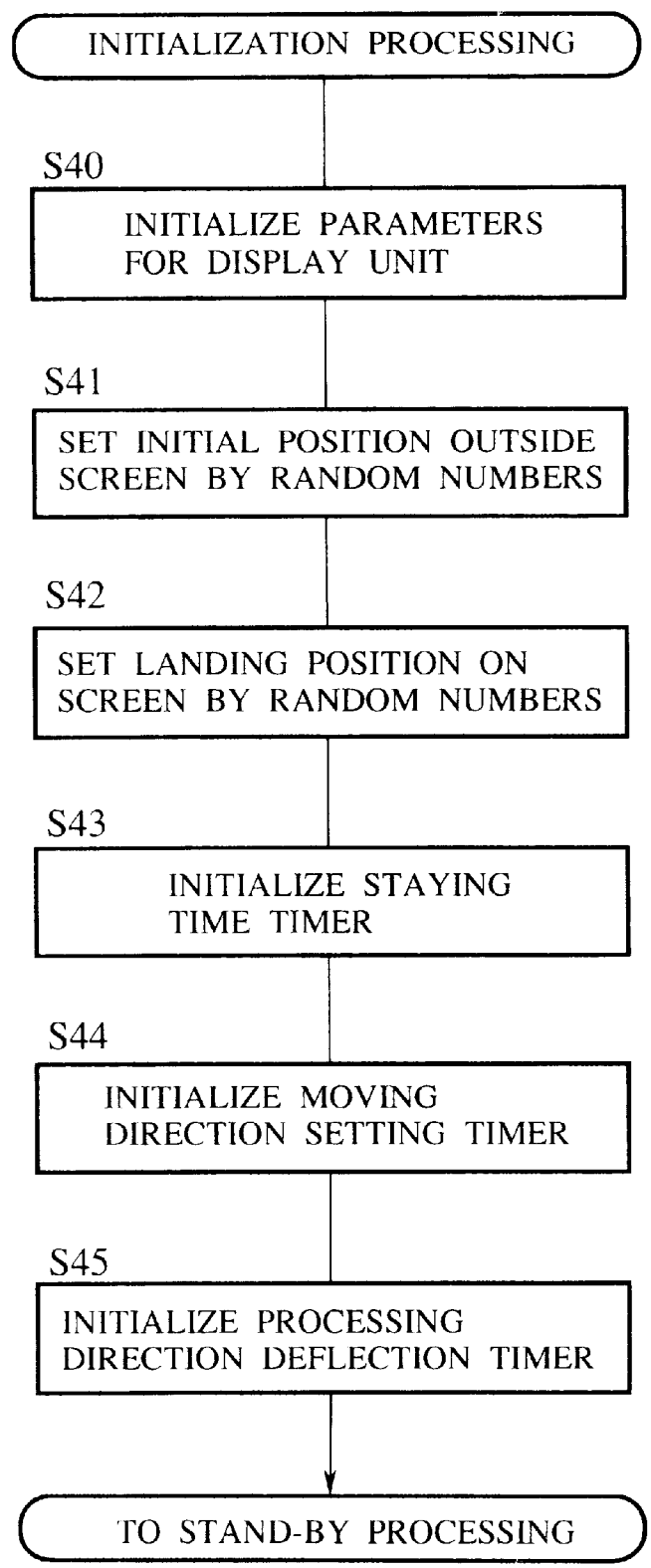
FIG. 11 is a flow chart of initialization processing of the first example of the video game.

FIG. 11 shows the flow chart of the initialization.

First, respective parameters for the display unit are initialized (step S40).

Then, an initialized position outside the screen, from which an insect appears, is set by random numbers (step S41). From the initialized position, the insect appears onto the screen.

Then, a landing position on the screen, at which the insect lands, is set by random numbers (step S42). The insect, which appears on the screen, first lands at the landing position.

Then, a staying time timer is initialized (step S43). The insect which appears onto the screen will fly-away outside the screen after a preset period of time. The staying time timer measures a period of time in which the insect stays on the screen.

Then, a moving direction setting timer is initialized (step S44). The insect resets, at a prescribed frequency, a moving direction while moving, based on surrounding color information. The moving direction setting timer measures a period of time until a next reset of a moving direction.

Then, a proceeding direction deflection timer is initialized (step S45). A moving direction is deflected bit by bit at a prescribed frequency from a moving direction so as to make the motion of the insect look natural. The proceeding direction deflection timer measures a period of time until a next deflection of a moving direction.

The initialization processing is followed by the next stand-by processing.

(Stand-by Processing)

Figure 12:
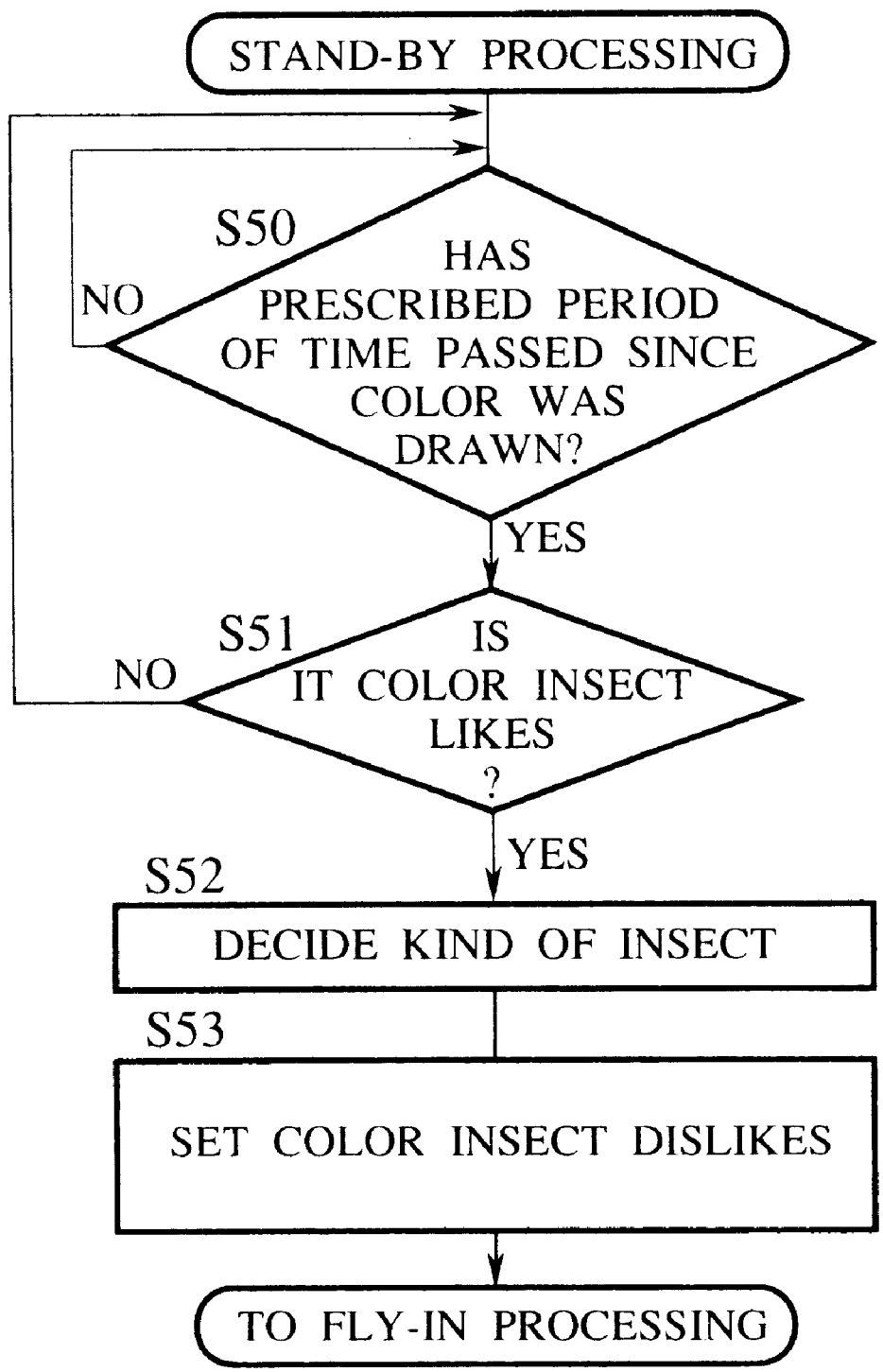
FIG. 12 is a flow chart of stand-by processing of the first example of the video game.

FIG. 12 shows the flow chart of the stand-by processing.

Figure 20:
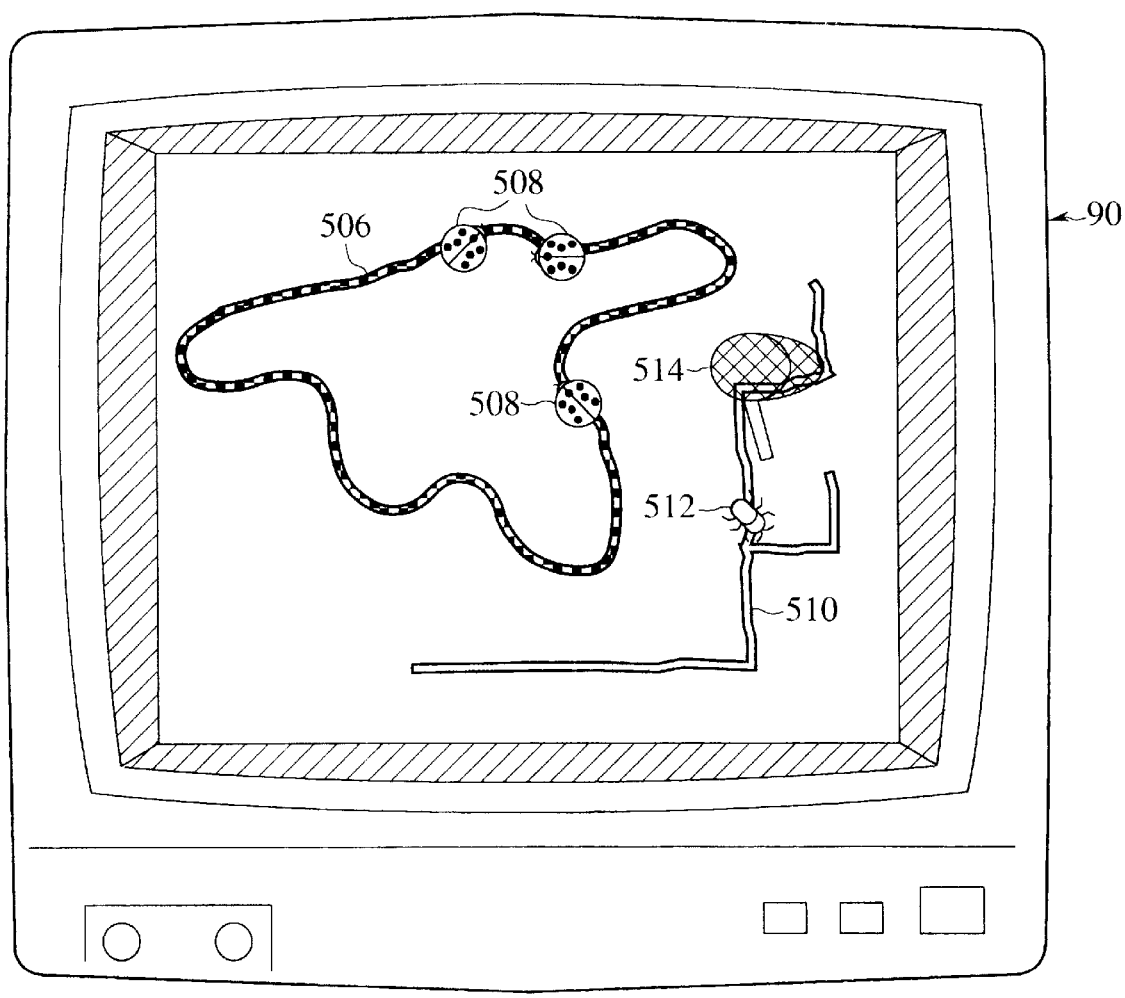
FIG. 20 is a view of one example of pictures on the canvas of the first example of the video game.

In the stand-by processing, the processing stands by until a specific color for generating an insect on the canvas is drawn, and when the specific color is drawn, a kind of the insect to be generated, corresponding to the specific color, is decided. For example, as shown in FIG. 20, when a red line 506 is drawn, a red ladybug 508 which likes red is generated, and when a blue line 510 is drawn, an insect 512 which likes blue is generated.

First, it is judged whether or not a prescribed period of time has passed since a color is drawn on the canvas (step S50). If no color is drawn on the canvas, or if a color is drawn on the canvas and the prescribed period of time has not elapsed, step S50 is repeated.

When the specific color is drawn, and the prescribed period of time has passed, then it is judged whether or not the prescribed color is a color an insect likes, i.e., whether or not the prescribed color is a color for generating an insect (step S51). When the prescribed color is not a color an insect likes, step S50 is repeated.

When the specific color is a color which an insect likes, a kind of an insect corresponding to the specific color is decided (step S52). For example, when a specific color is red, a ladybug is selected, and when a specific color is blue, an insect which likes blue is selected.

Subsequently, based on the decided kind of the insect, a color the decided insect dislikes is set (step S53). For example, when the decided insect is a ladybug, green is selected, and when the decided insect dislikes blue, brown is selected.

When the stand-by processing is over, the fly-in processing follows.

(Fly-in Processing)

Figure 13:
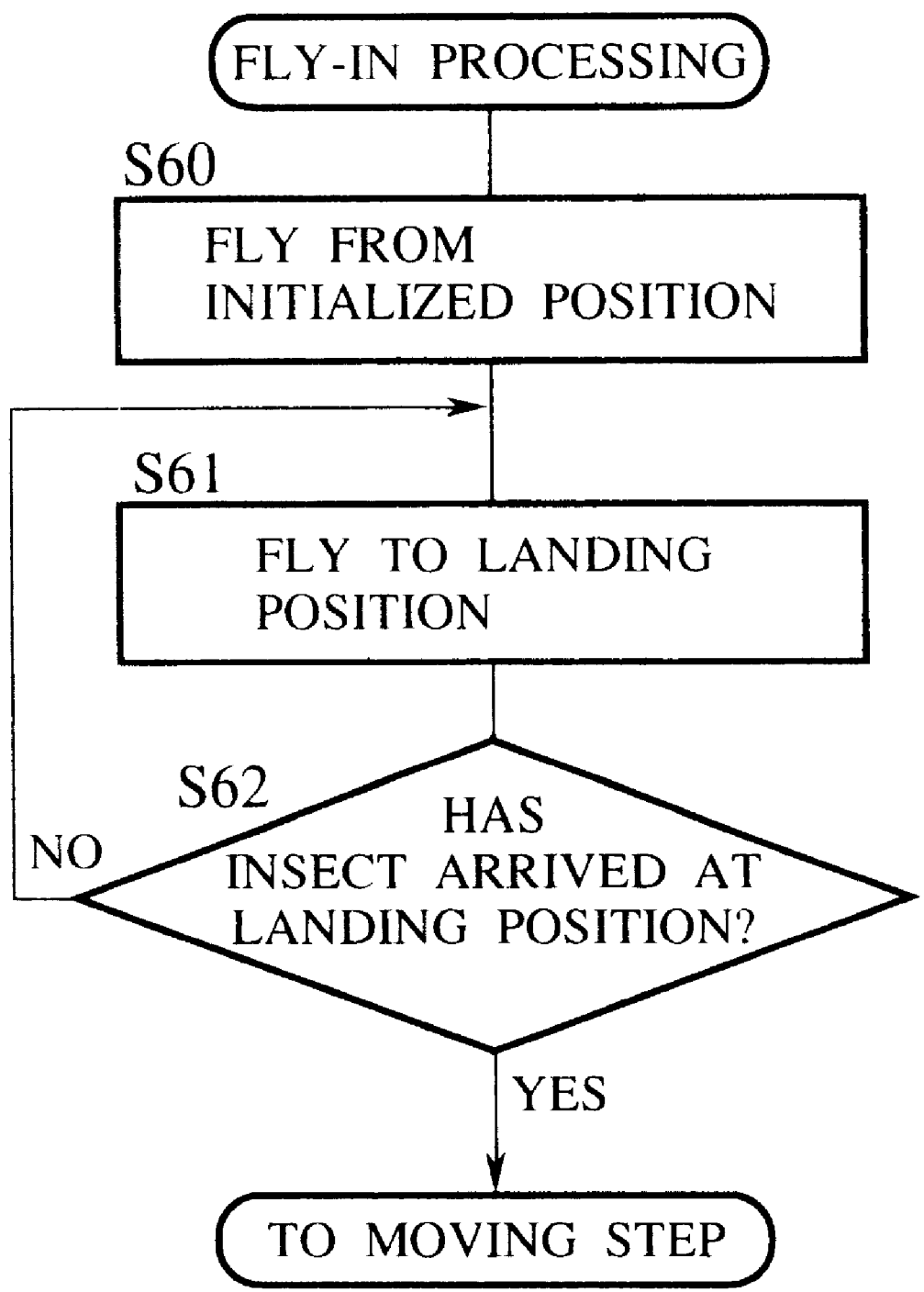
FIG. 13 is a flow chart of fly-in processing of the first example of the video game.

FIG. 13 shows the flow chart of the fly-in process.

First, from the initialized position outside the screen set by the initialization processing step S41 an insect of a kind decided in the stand-by processing step S52 is flown (step S60), and the insect is flown to the landing position on the screen decided in the initialization processing step S42 in FIG. 11 (step S61).

Subsequently it is judged whether or not the insect has arrived at the landing position (step S62). Unless the insect has arrived at the landing position, the step is returned to step S61. When the insect has arrived at the landing position, the fly-in processing is finished, and the next movement processing follows.

(Movement Processing)

Figure 14:
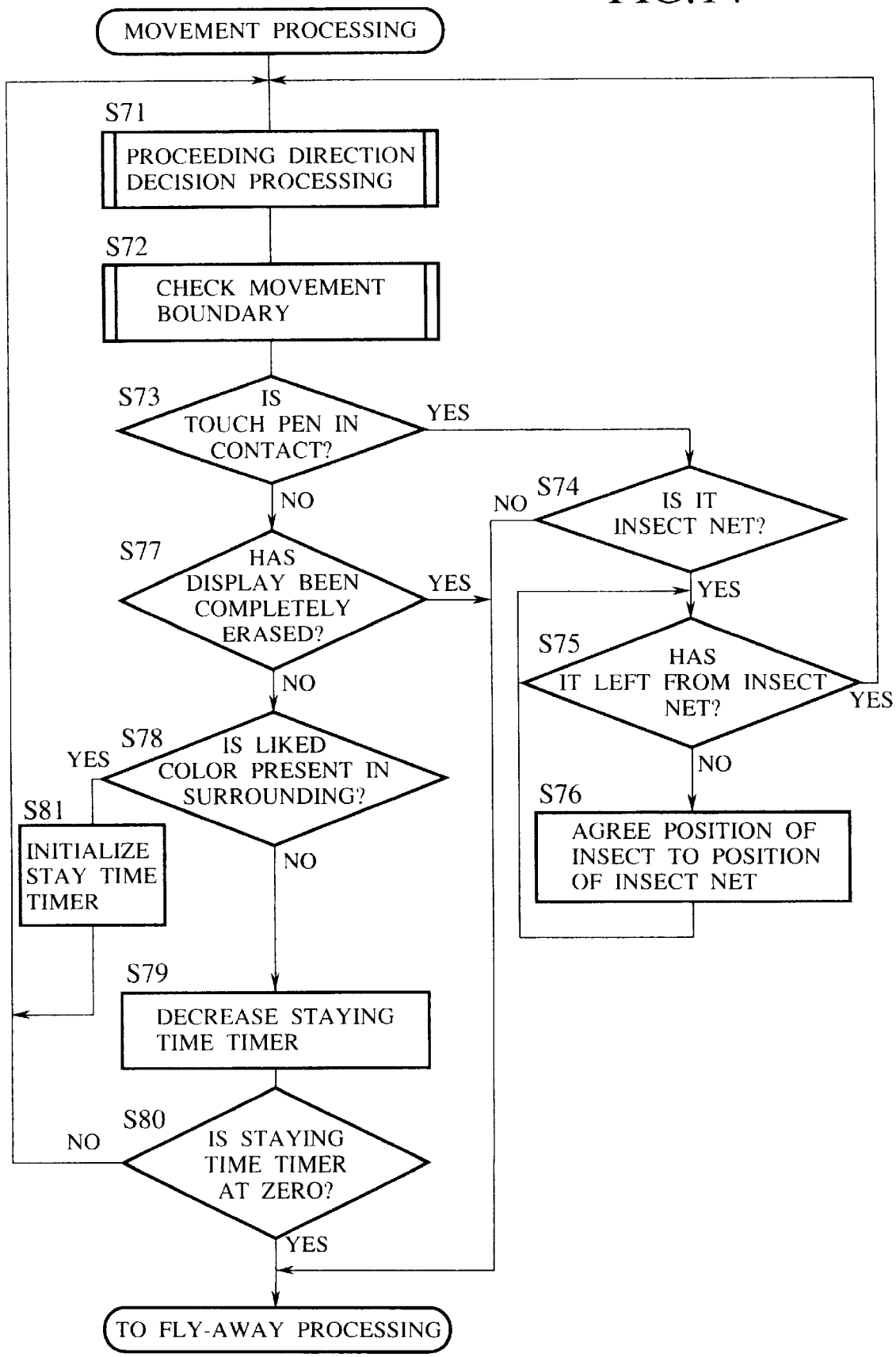
FIG. 14 is a flow chart of movement processing of the first example of the video game.
Figure 15:
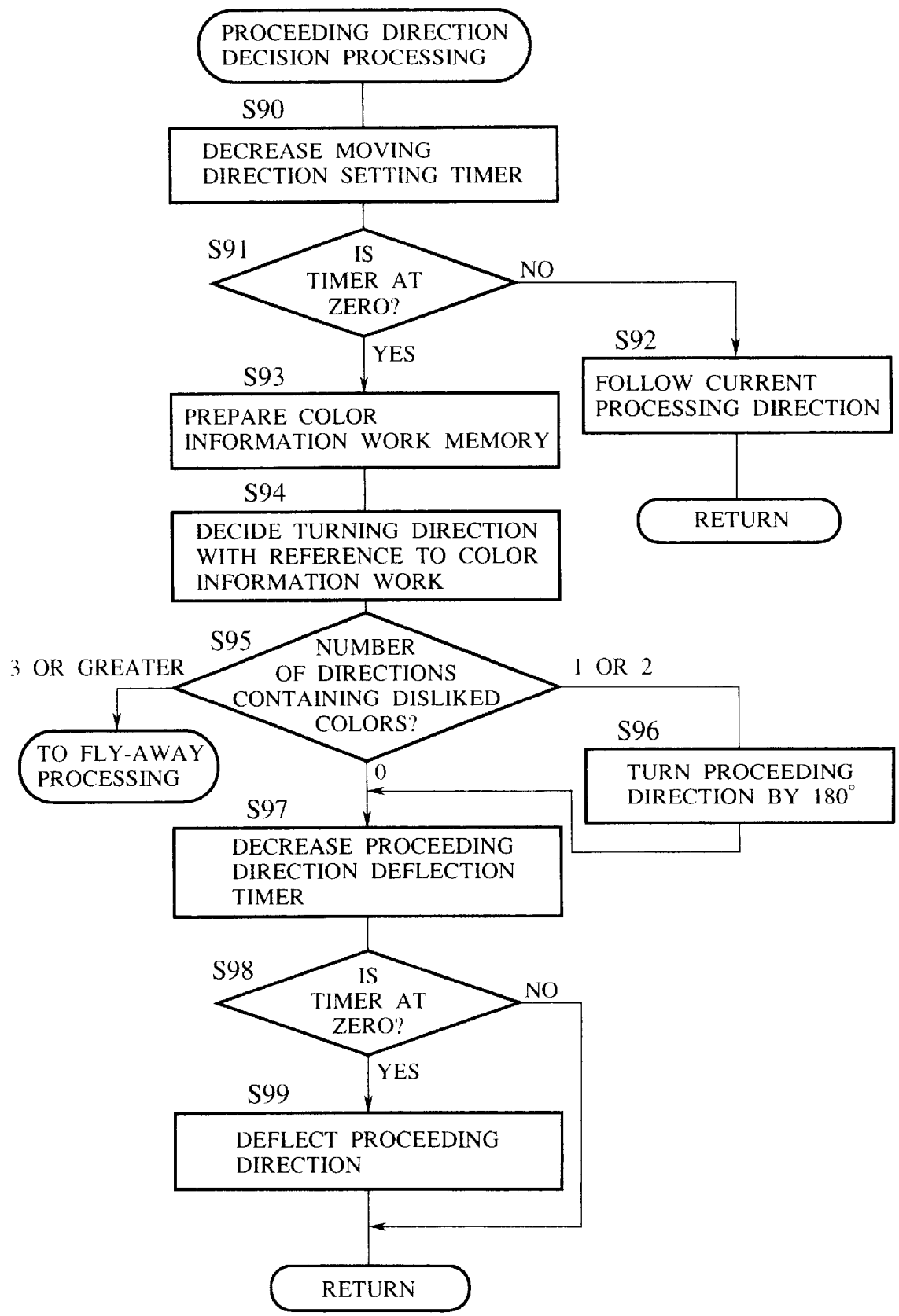
FIG. 15 is a flow chart of proceeding direction decision processing of the first example of the video game.
Figure 16:
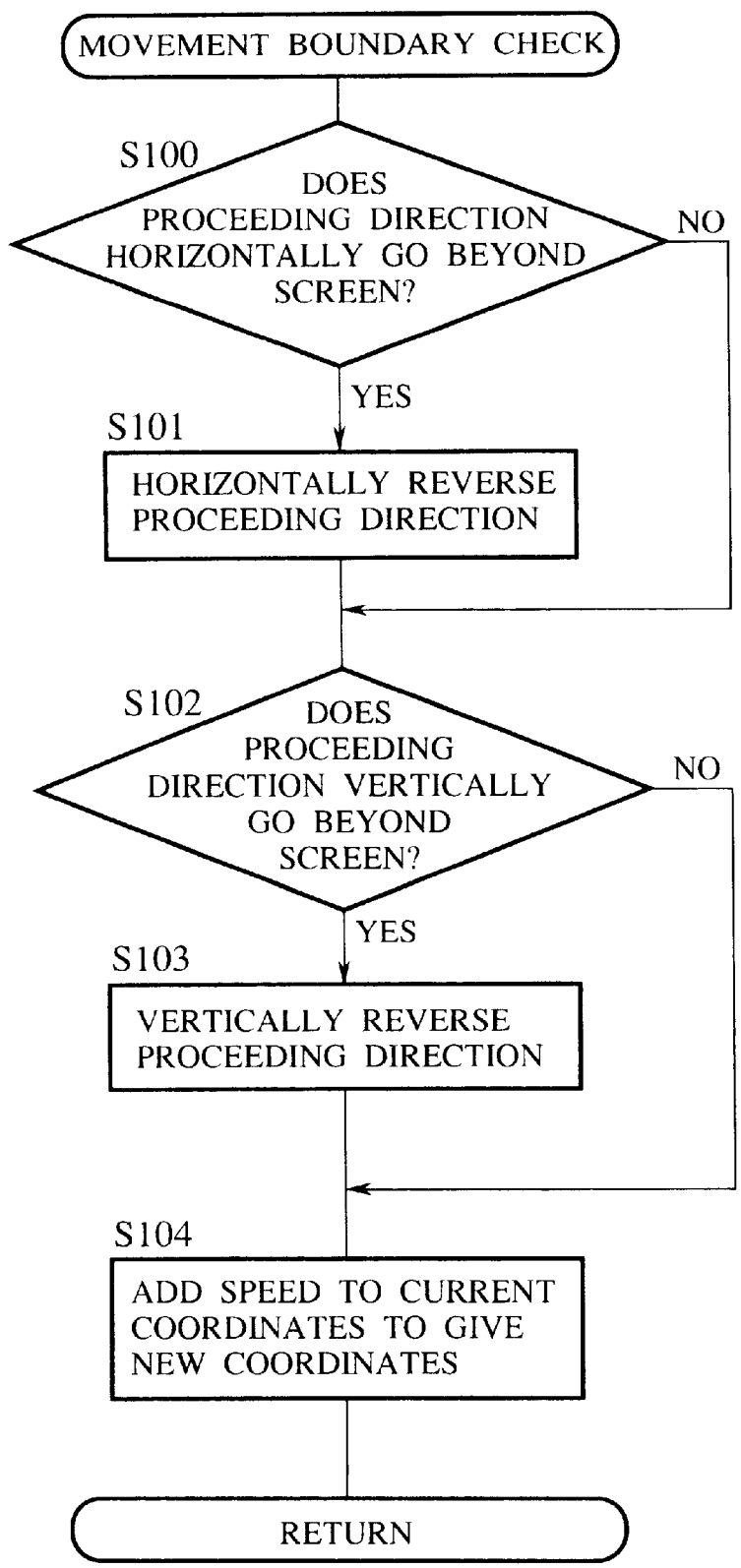
FIG. 16 is a flow chart of movement boundary check processing of the first example of the video game.

FIG. 14 shows the flow chart of the movement processing. FIG. 15 is the flow chart of the proceeding direction decision processing in the movement processing. FIG. 16 shows the flow chart of movement boundary check processing in the movement processing.

As shown in FIG. 14, the proceeding direction decision processing for deciding a proceeding direction of the insect corresponding to a surrounding color (step S71). The proceeding direction deciding processing will be detailed with reference to FIG. 15.

In the proceeding direction decision processing, first, the moving direction setting timer is decreased (step S90), and it is judged whether or not the moving direction setting timer is at zero (step S91). Unless the moving direction setting timer is at zero, a current proceeding direction is retained without a change, and the moving direction processing is finished.

Figure 18:
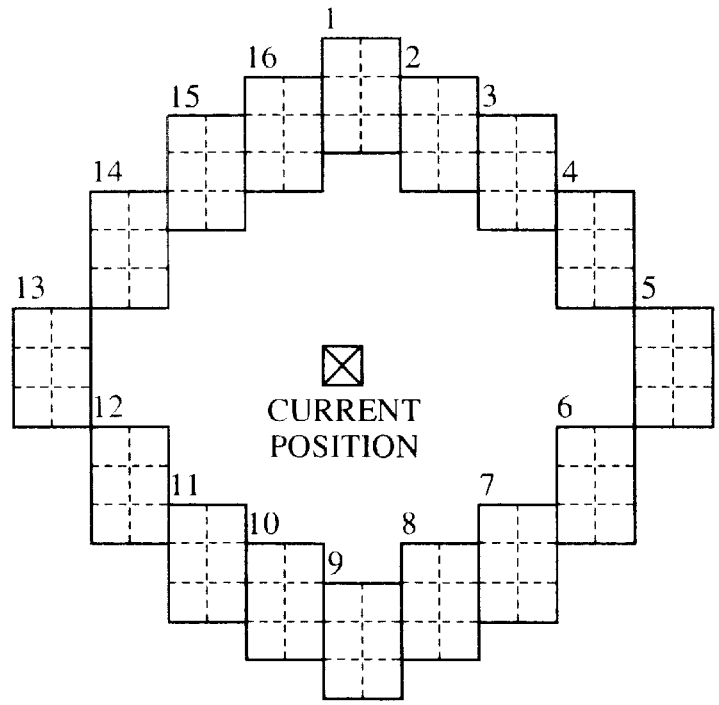
FIG. 18 is an explanatory view of the proceeding direction decision processing of the first example of the video game.
Figure 19:
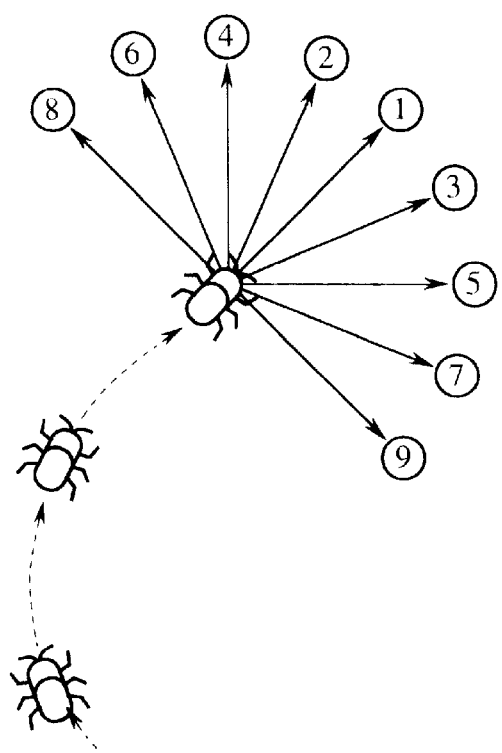
FIG. 19 is an explanatory view of the proceeding direction decision processing of the first example of the video game.

When the moving direction setting timer is at zero, a color information work memory is prepared (step S93). The color information work memory detects and stores color information surrounding a current position of the insect for reference upon deciding a proceeding direction. As shown in FIG. 18, 16 specific directional regions are set around a current position of the insect. The 16 specific directional regions are positioned all around a current position spaced from the current position by a prescribed distance. Each specific directional region has an area of a prescribed dot number, e.g., 6 dots.

The proceeding direction deciding unit 107 reads color information in the specific directional regions. The proceeding direction deciding unit 107 outputs read respective dot positions of the specific directional regions to the coordinate conversion unit 116, and the coordinate conversion unit 116 converts the dot positions to addresses of the buffer memory 120. The color information reading unit 118 reads the color information at the converted addresses of the buffer memory 120 and outputs the same to the proceeding direction deciding unit 107. The proceeding direction deciding unit 107 judges whether or not the color information contains colors an insect likes or dislikes, and counts the number liked and disliked colors. The proceeding direction deciding unit 107 reads color information in all of the 18 specific directional regions, and counts the number of liked and disliked colors and stores the numbers.

Then, with reference to the color information work memory, a next proceeding direction of the insect (hereinafter called "turning direction") is decided (step S94). A direction having more liked colors with respect to a current position is decided to be a turning direction. As exemplified in FIG. 19, when it is assumed that a current proceeding direction is upper right (1), first the specific directional region in the upper right direction (1) which is the current proceeding direction is checked for color information, then the specific directional region in the left adjacent direction (2) thereto (1) is checked, then, the specific directional region in the right adjacent direction (3) thereto (2), and next, the specific directional region in the left adjacent direction (4) thereto (3) is checked. Thus, in the sequence of the circled numbers in FIG. 9, nine of the specific directional regions on both sides of the current proceeding direction are checked for color information. A dot number of liked colors, and an absence/presence of disliked colors are checked.

As result of checking, one of the directions which is found to have a largest number of liked colors is the turning direction. When directions have equal dot numbers, a direction having a smaller circled number in FIG. 9 becomes the turning direction, and thus a direction which is nearer to the current direction has priority.

Then, based on the absence/presence of disliked colors checked in Step S94, a number of specific directional regions containing the disliked colors are counted (step S95). If none of the specific directional regions contain disliked colors, the turning direction decided in step S94 is retained, and Step S97 follows. When one or two of the specific directional regions are present, it is judged that disliked colors are present in the surrounding area, and the turning direction decided in Step S94 is changed by 180° (step S96), and Step S97 follows. When 3 or more of the specific directional regions containing disliked colors are present, it is judged that a lot of disliked colors are present in the surrounding area, and the insect flow away (step S34).

Then, the proceeding direction deflection timer is decreased (step S97), and it is judged whether or not the proceeding direction deflection timer is at zero (step S98). If the proceeding direction deflection timer is not at zero, the present direction is not turned to be maintained and then the proceeding direction decision processing is finished.

If the proceeding direction deflection timer is at zero, the decided turning direction is deflected (step S99). One of the decided turning directions, either a turning direction counter-clockwise adjacent to the decided turning direction, or a turning direction clockwise and adjacent to the decided turning direction, is selected based on random numbers, and the selected direction becomes a new turning direction.

When a proceeding direction of the insect is decided based on surrounding color information in the proceeding direction deciding processing in Step S71, a movement boundary check processing for turning back the proceeding of the insect at a boundary edge of the screen is conducted (step S72). The movement boundary check processing will be detailed with reference to FIG. 16.

In the movement boundary check processing, when the turning direction decided by the proceeding direction decision processing is selected, it is first judged whether or not the decided turning direction will go beyond the edge of the screen in either the left or the right directions (step S100). When it is judged that the turning direction will go beyond the edges, the proceeding direction is oppositely turned left or right. (step S101).

Next, when the proceeding direction is turned in a turning direction decided by the proceeding direction decision processing, it is judged whether or not the proceeding direction will go beyond either the upper or lower edges of the screen (step S102). When it is judged that the decided turning direction will go beyond either the upper or lower edges, the proceeding direction is turned in the opposite direction either downward or upward (step S103).

A current speed component is added to the thus decided final turning direction to decide the next coordinates (step S104). The drawing processing unit 104 draws the insects so that the insect moves to the thus decided coordinates.

When the next coordinates are finally decided by the moving boundary processing in Step S72, processing of the insect catching game in step S73 and the following steps in FIG. 14 follow.

The insect catching game will be summarized. When a game player wishes to play the insect catching game, the game player contacts the touch pen 28 to the net region 213 to display a cursor 514 of the insect net on the monitor 90 as shown in FIG. 20. When the touch pen 28 is moved in contact with the drawing tablet 24 by pressing the pen button 28a, the insects 508, 512 on the monitor can caught and moved together with the insect net 514.

First, it is judged whether or not the cursor is, by the use of the touch pen 28, in contact with the insect on the screen while the pen button 28a is being pressed (step S73). When the cursor is in contact with the insect on the screen, and the pen button 28a is being pressed, it is judged whether or not the cursor is in the insect net (step S74). When it is judged that the cursor is not in the insect net, the next fly-away processing follows (step S34).

When it is judged that the cursor is in the insect net, it is judged whether the cursor has left from the insect net (step S75). When it is judged that the cursor has left from the insect net, the processing is returned to step S77 to repeat the above-described processing is repeated. Unless the cursor has left from the insect net, it is judged that the insect has been caught with the insect net, and new coordinate values are decided so that the insect is moved to the center of the insect net (step S76). Subsequently the processing is returned to step S75 to repeat steps S75 and S76. Thus the insects 508, 610 can be caught with the insect net 514 and moved together with the insect net.

When it is judged in step S73 that the cursor on the screen is not, by the use of the touch pen 28, in contact with the insect, then it is judged whether or not the display has been erased (step S77). When the display has been completely erased, the next fly-away processing (step S34) follows.

Unless the display is not completely erased, it is judged with reference to the color information work memory whether or not a color the insect likes is present in the surroundings (step S78). When the liked color is present in the surrounding, a staying time timer is initialized (step S81), and the processing is returned to step S77 to repeat the above-described processing.

Unless the like color is present in the surrounding, the staying time timer is decreased (step S79), and it is judged whether or not the staying time timer is at zero (step S80). Unless the staying time timer is at zero, the processing is returned to step S77 to repeat the above-described processing. When the staying time timer is at zero, the next fly-away processing follows (step S34).

(Fly-away Processing)

Figure 17:
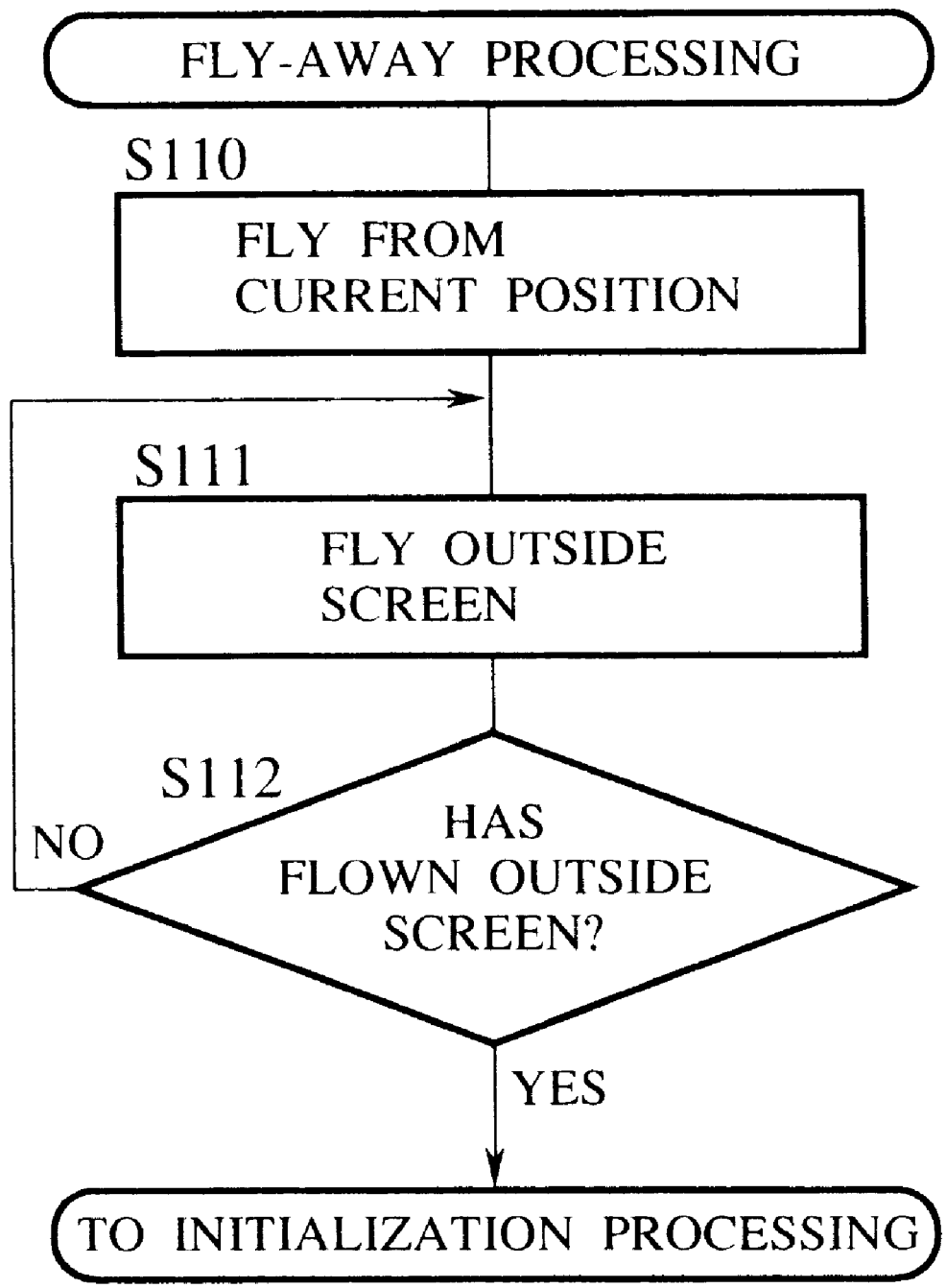
FIG. 17 is a flow chart of fly-away processing of the first example of the video game.

FIG. 17 shows the flow chart of the fly-away processing.

First, the insect is flown from a current position (step S110), to a prescribed position outside the screen (step S111). Then, it is judged whether or not the insect has flown outside the screen (step S112). Unless the insect is outside the screen, the processing is returned to step S111. When the insect is outside the screen, the fly-away processing is finished, and the processing is returned to the initialization step to repeat the above-described processing.

Thus, the generation and movement of the insects are automatically conducted and require no special operations by a game player, and the game player can play catching-insect-games with the insect net or other games.

By the above-described sound making processing and moving body drawing processing, it is possible not only for pictures to be drawn on the monitor, but also for various games, such as making sounds, playing music, caching insects, etc., to be played using the pictures.

(A Second Example of the Video Game)

Next, a second example of the video game of the video game device according to the present embodiment will be explained with reference to FIGS. 21 to 32. The second example is different from the second example in the sound making processing and the moving body drawing processing.

(Sound Making Processing 2)

Figure 21:
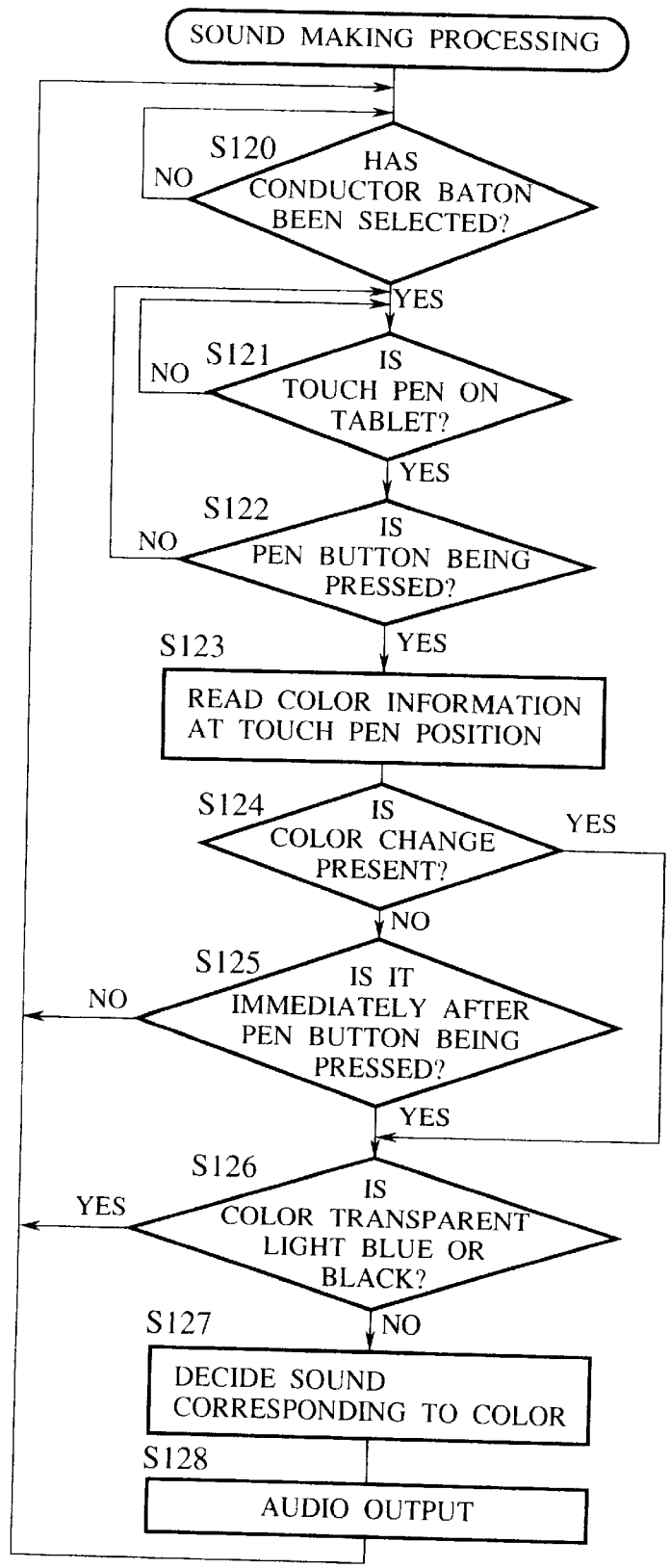
FIG. 21 is a flow chart of sound making processing of a second example of the vide game.

The sound making processing according to the present example will be explained with reference to the flow chart of FIG. 21. The sound making processing will be explained for a sample picture of the grand piano shown in FIG. 22.

Figure 22:
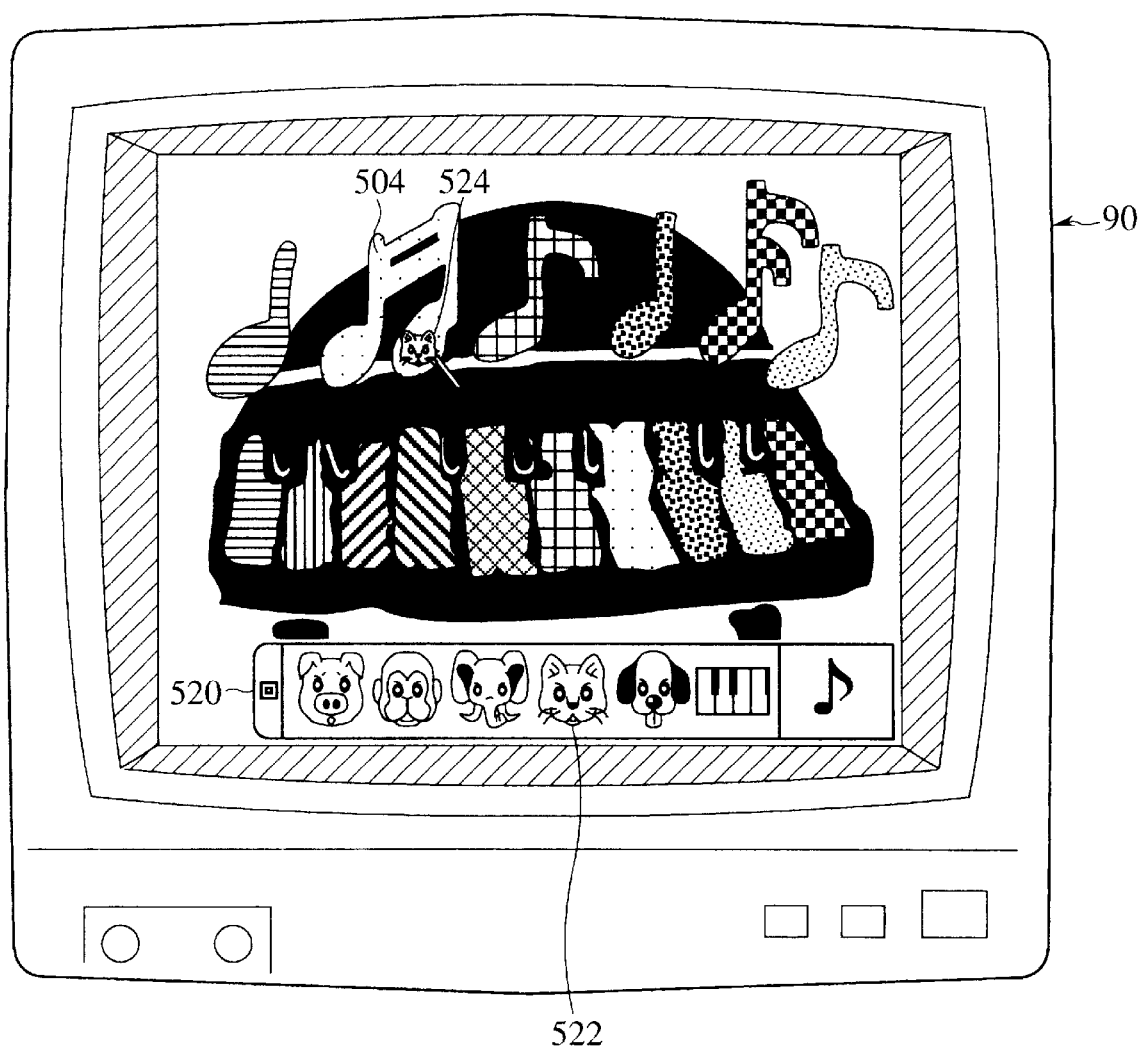
FIG. 22 is a view of an example of sample pictures of the second example of the video game.

First, it is judged which kind of conductor batons has been selected by the touch pen 28 (step S120). In the present example, in addition to a conductor baton, for selecting the usual organ sounds, conductor batons which can make timbres of animals can be selected. As shown in FIG. 22, the different kinds of the conductor batons can be displayed in a tool box 520 on the screen, and a game player operates the touch pen 28 to position the cursor on a picture of an animal in the tool box 52 and presses the pen button 28a to select the required animal. For example, when the cat picture 522 in the tool box 520 is selected, as shown in FIG. 22 the conductor baton having the cat picture on the tip portion is displayed.

Then, it is judged whether or not the touch pen 28 is on the drawing tablet 24 (step S121), and further it is judged whether or not the pen button 28 is being pressed (step S122). When the game player contacts the touch pen 28 to the drawing tablet 24, the sound making processing unit 108 outputs a position signal to the coordinate conversion unit 116, and there the position signal is converted to an address of the buffer memory 120. Then, the color information reading unit 118 reads a color signal at the converted address of the buffer memory 120 and outputs the signal to the sound making processing unit 108 (step S123).

Then, it is judged whether or not a change has been made to the color information (step S124). When no change has been made to the color information, it is judged whether it is immediately after the pen button 28a being pressed (step S125). Unless it is immediately after the pen button 28a being pressed, the processing is returned to step S120.

When it is immediately after the pen button 28a being pressed, the sound making processing unit 108 judges whether the read color information is transparent, light blue or black (step S120). When the read color information is transparent, light blue or black, no sound is made, and the processing is returned to step S120.

Unless the read color information is transparent, light blue, or black, the sound making processing unit 108 decides a sound to be made corresponding to the read color information and the kind of the conductor batons (step S127). Timbres (organ sound, dogs' sound, cats' sound, monkeys' sound, pigs' sound, and elephants' sound) are set corresponding to the kinds of the conductor batons, and a sound making frequency table which sets magnifications of sound frequencies corresponding to respective color information is prepared, and based on a timbre and the sound making frequency table, a sound to be made is set. For example, when a cat is selected, a scale can be played using cats' sounds.

Subsequently, the sound making processing unit 108 outputs a decided sound signal to the monitor 90 through the audio terminal 76, and a sound is generated (step S128).

In FIG. 22, in which the cat conductor baton 524 is positioned on the yellow note 504, a sound which is preset for the cat conductor baton and the color yellow, e.g., the cats' sound in B tone.

Thus by moving the touch pen 28 on the drawing tablet 24 and pressing the pen button 28a, various sounds can be made corresponding to commanded colors.

(Moving Body Drawing Processing 1)

The animal movement drawing processing for moving an animal in the present example will be explained with reference to FIGS. 23 to 32.

Figure 30:
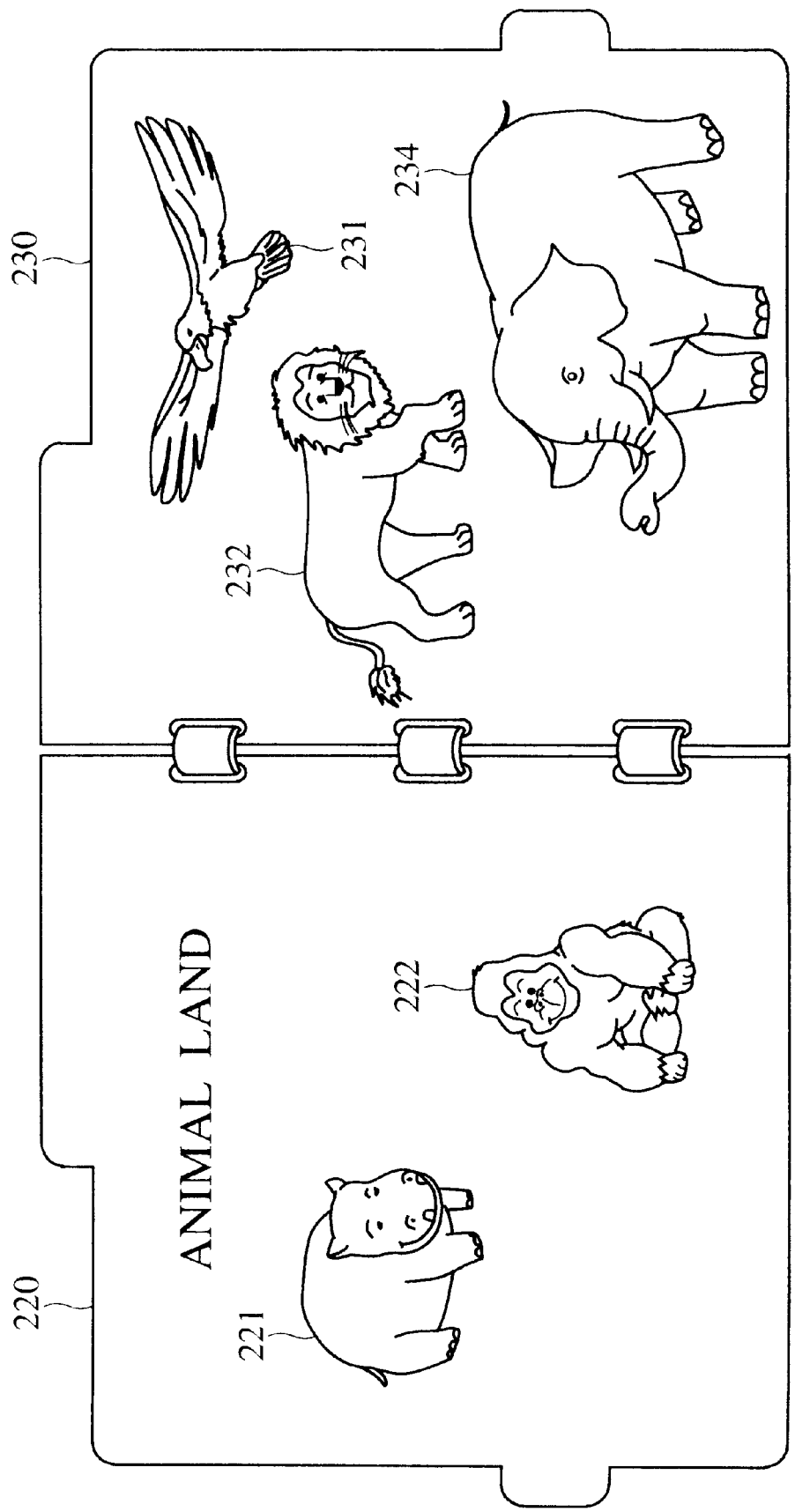
FIG. 30 is a view of an example of pictures of the software cartridge of the second example of the video game.

In the animal movement drawing processing, a picture of an animal in a picture book is clicked to display the animal on the canvas, and the animal is moved along a line of a color. A picture of the animal is changed corresponding to surrounding color information to sometimes rest or make other actions. As shown in FIG. 30, according to the present example, a hippopotamus 221, a gorilla 222, a lion 232, a bird 231 and an elephant 234 are drawn in the picture book, and these animals can be displayed.

(Basic Flow)

Figure 23:
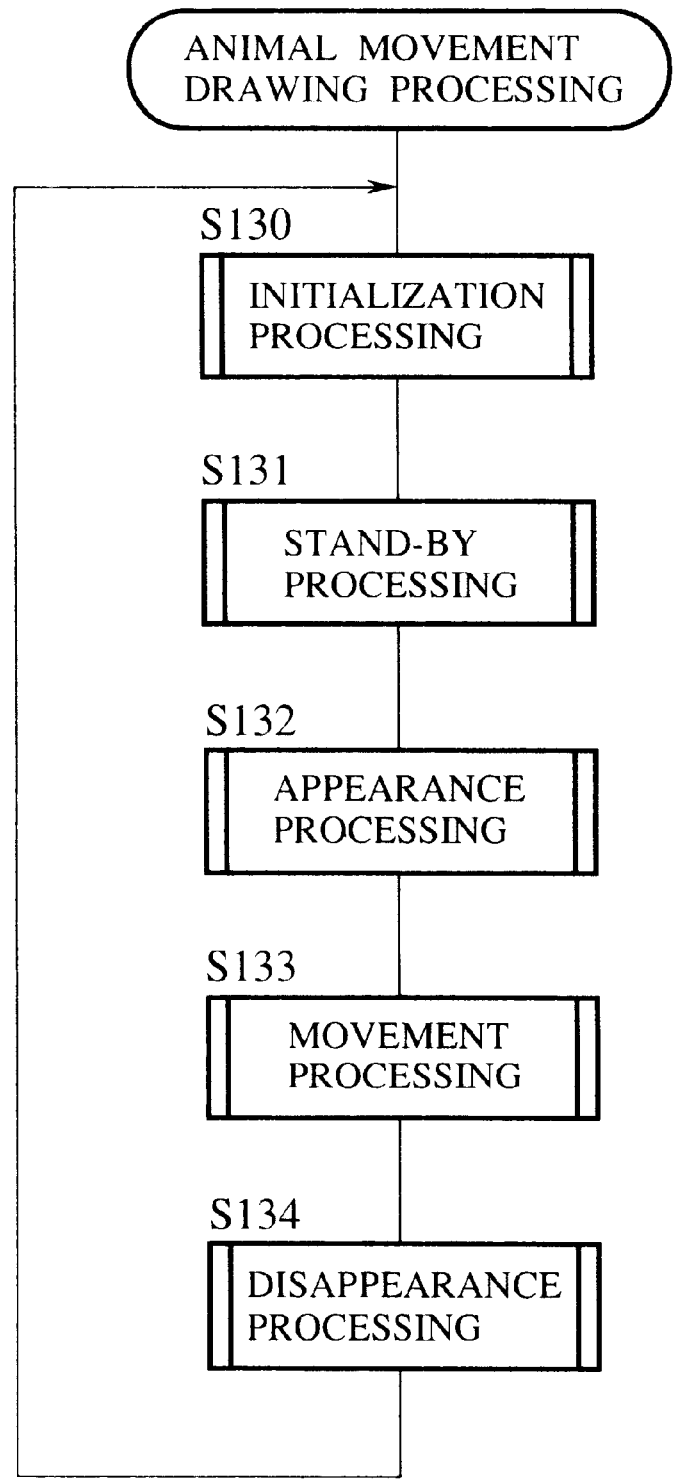
FIG. 23 is a flow chart of animal movement drawing processing of the second example of the video game.

FIG. 23 shows the basic flow chart of the animal movement drawing processing.

The basic flow of the animal movement drawing processing includes an initialization processing for initializing respective parameters (step S130), a stand-by processing for standing by until the appearance of an animal is commanded (step S131), an appearance processing for causing a selected animal to appear onto the screen (step S132), a movement processing for moving and resting the animal on the screen or causing the animal to make other actions (step S133), and a disappearance processing for causing the animal to disappear from the screen (step S134). The drawing processing is conducted separately for each of a number of selected animals.

Each processing will be sequentially detailed.

(Initialization Processing)

Figure 24:
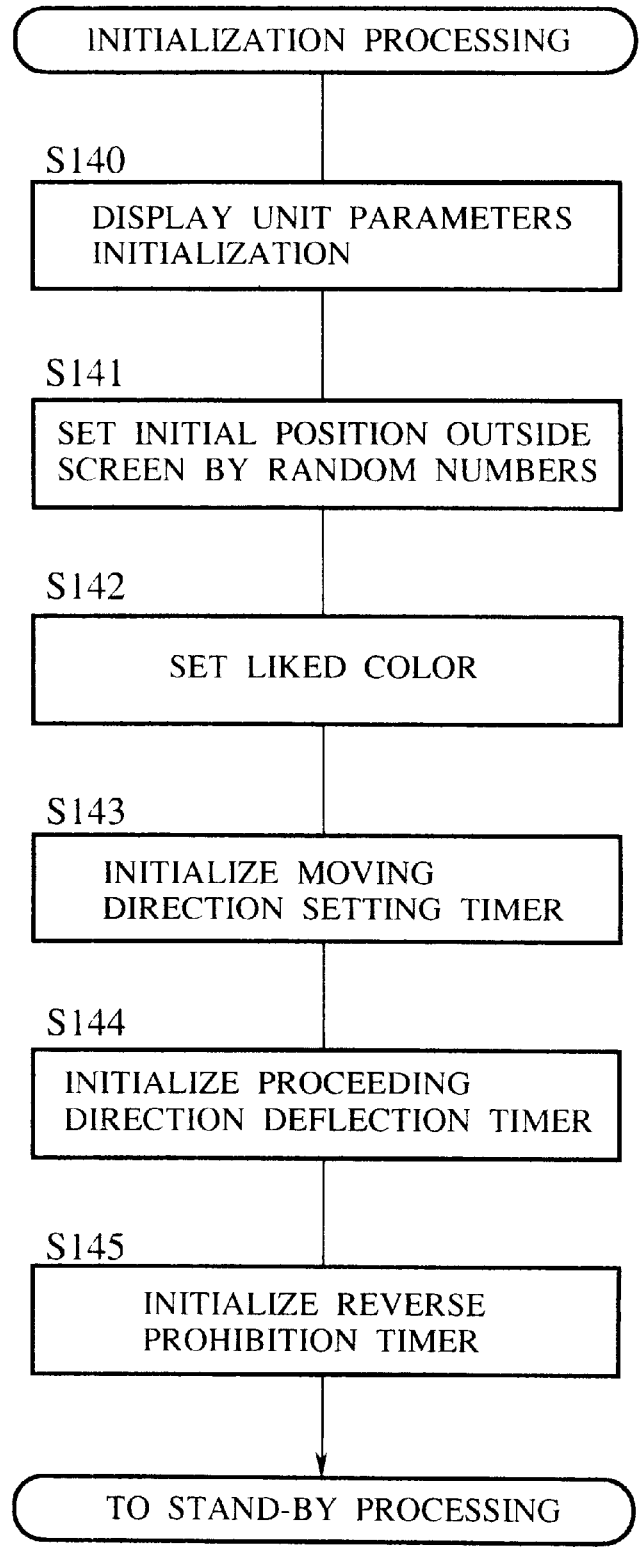
FIG. 24 is a flow chart of initialization processing of the second example of the video game.

FIG. 24 shows the flow chart of the initialization.

First, respective parameters for the display unit are initialized (step S140).

Then, an initialized position outside the screen, at which an animal appears is set by random numbers (step S141). From the initialized position, the animal appears.

Then colors liked by appearing animals are set corresponding to the respective animals (step S142). For example, a hippopotamus likes light blue, and an elephant likes green.

Then, a moving direction setting timer is initialized (step S143). The animal resets, at a prescribed frequency, a moving direction while moving, based on surrounding color information. The moving direction setting timer measures a period of time until a next reset of a moving direction.

Then, a proceeding direction deflection timer is initialized (step S144). A moving direction is deflected bit by bit at a prescribed frequency from a moving direction so as to make the motion of the animal look natural. The proceeding direction deflection timer measures a period of time until a next deflection of a moving direction.

Then, a reverse prohibition timer is initialized (step S145). When a moving direction of the animal is reversed, an image of the animal is changed corresponding to a reverse direction, but to make the motion of the animal look natural, the image of the animal is not changed immediately when the moving direction is reversed, and the animal is prohibited from reversing for a prescribed period of time. The reverse prohibition timer counts a period of time during which an image of the animal is restrained from reversing.

The initialization processing is followed by the next stand-by processing.

(Stand-by Processing)

Figure 25:
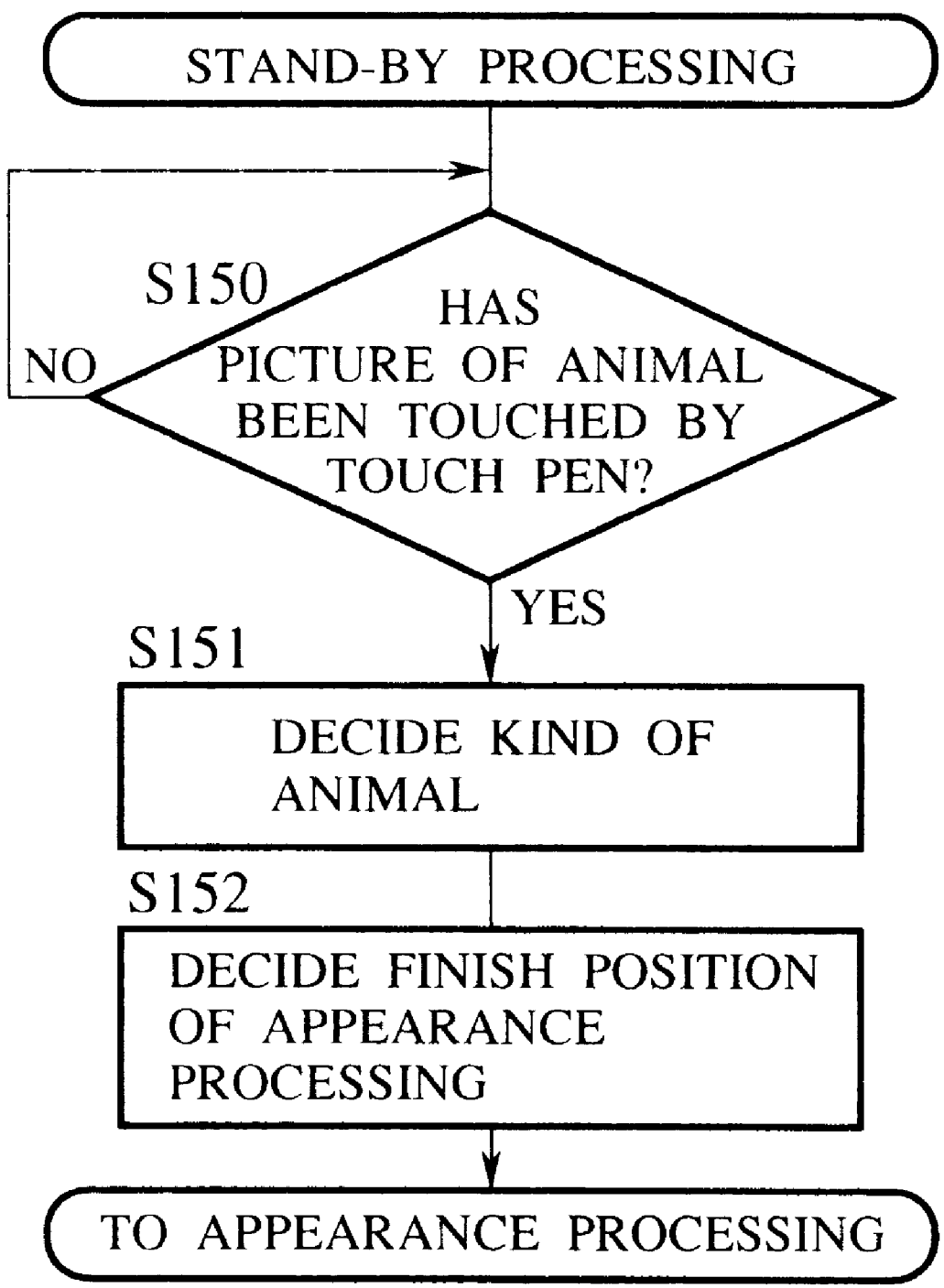
FIG. 25 is a flow chart of stand-by processing of the second example of the video game.

FIG. 25 is the flow chart of the stand-by processing.

The stand-by processing causes the processing to stand by until the touch pen 28 touches a picture of an animal in the picture book, and prepares appearance of the touched animal.

First, it is judged whether or not the touch pen 28 has touched an animal picture in the picture book (step S150). If the touch pen 28 touches nowhere, or if the touch pen 28 touches a part other than positions of animal pictures, the processing is returned to step S150.

When the touch pen 28 touches an animal picture, a kind of an animal is decided, based on an output from the picture book tablet 32 (step S151).

Subsequently an end position on the canvas at which movement of the animal will finish is set by random numbers (step S152).

The stand-by processing is followed by the next appearance processing.

(Appearance Processing)

Figure 26:
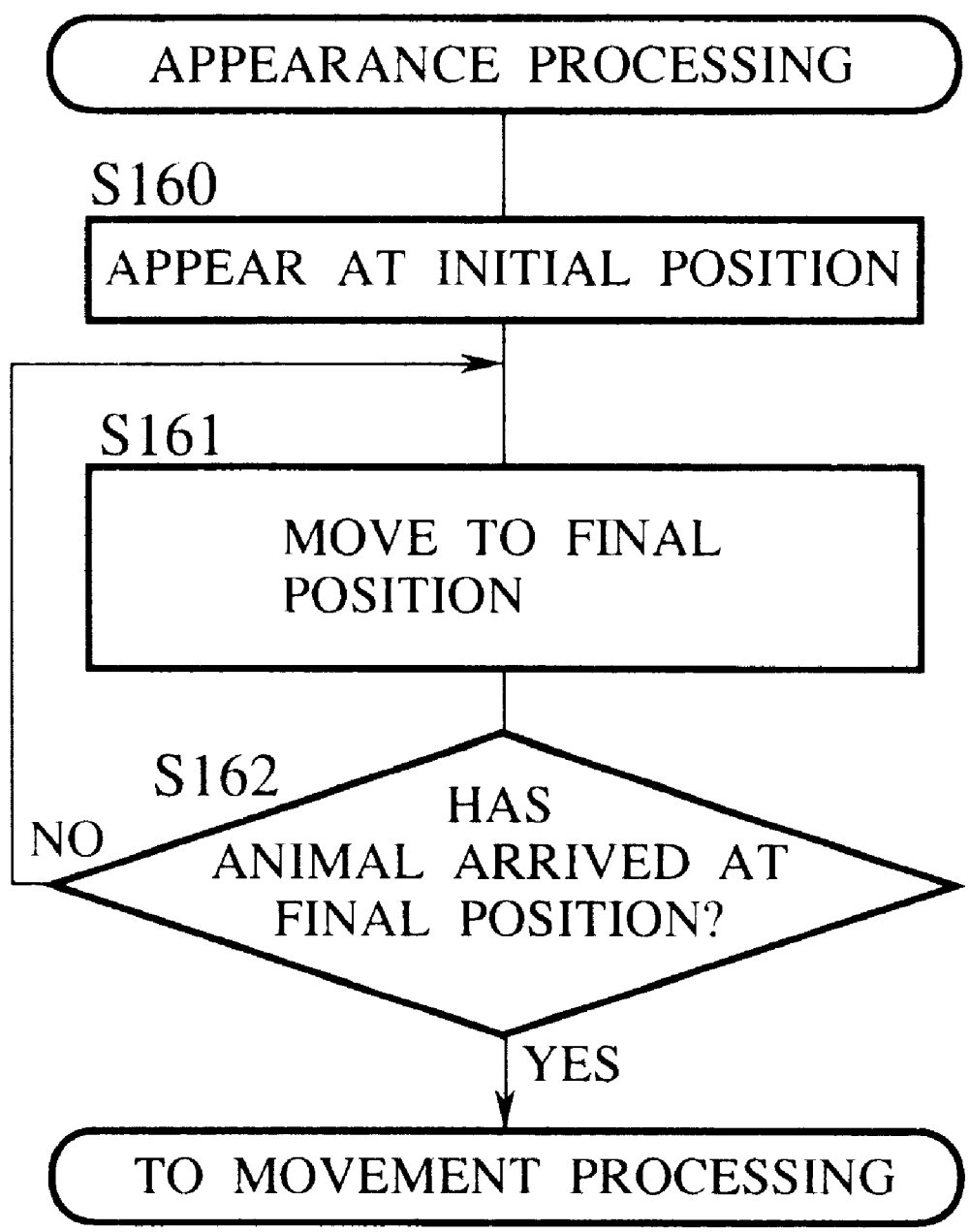
FIG. 26 is a flow chart of appearance processing of the second example of the video game.

FIG. 26 is the flow chart of the appearance processing.

First, from the initialized position outside the screen set by the initialization processing step S141 of the initialization processing of FIG. 24, the kind of an animal decided in the step S151 of the stand-by processing is caused to appear (step S160), and the animal is moved to the end position on the screen decided in step S152 of the stand-by processing of FIG. 25.

Subsequently it is judged whether or not the animal has arrived at the end position (step S162). Unless the animal has arrived at the end position, the process is returned to step S161. When the animal has arrived at the end position, the appearance processing is finished, and the next movement processing follows.

(Movement Processing)

Figure 27:
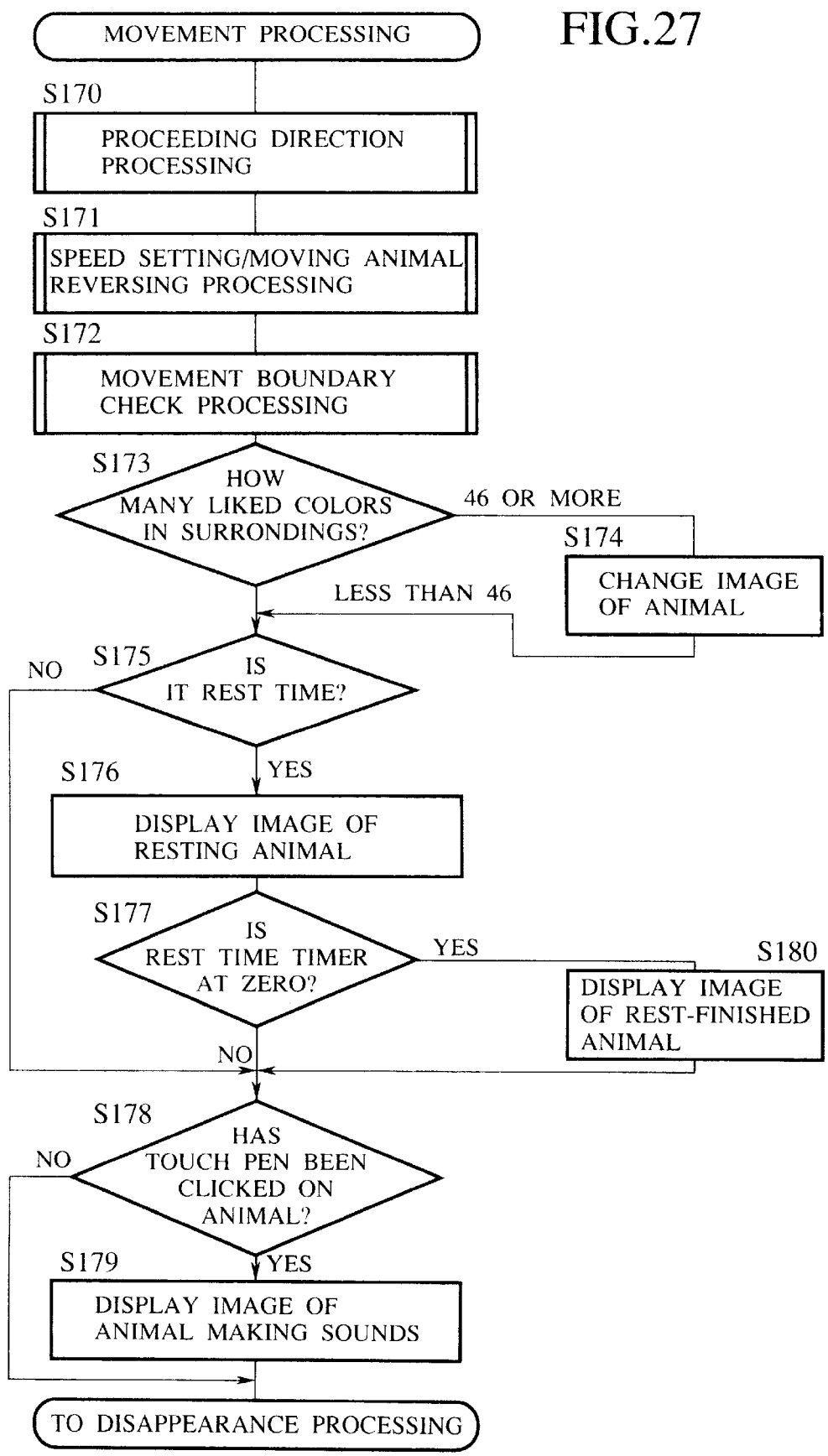
FIG. 27 is a flow chart of movement processing of the second example of the video game.
Figure 28:
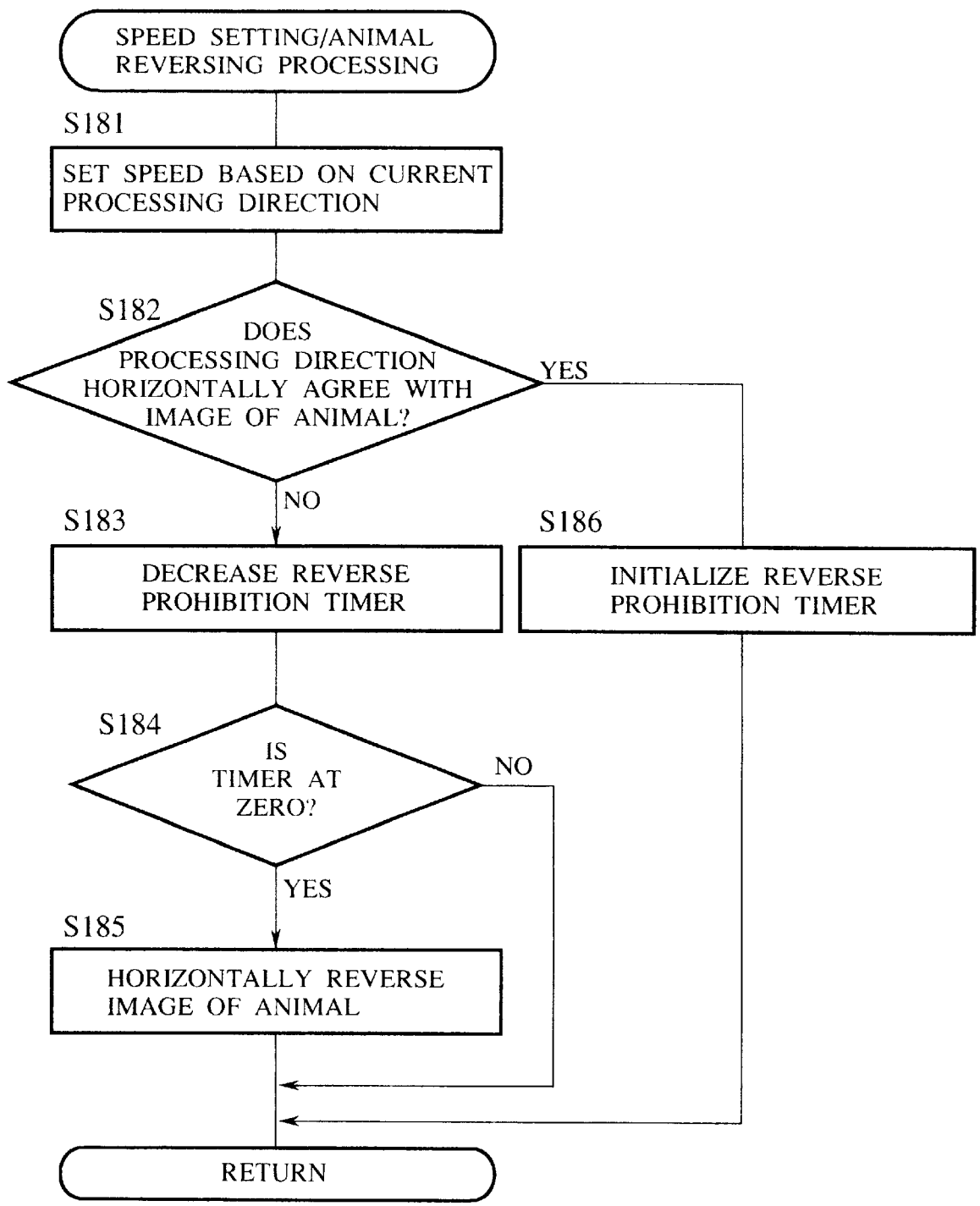
FIG. 28 is a flow chart of speed-setting/animal reversing processing of the second example of the video game.

FIG. 27 is the flow chart of the movement processing. FIG. 28 is the flow chart of speed setting/animal reversing processing in the movement processing. Proceeding direction decision processing and movement boundary checking processing in the movement processing are the same as in the first example, and their explanation is omitted.

First, as shown in FIG. 27, the proceeding direction decision processing for deciding a proceeding direction of the animal corresponding to a surrounding color (step S170). Details of the proceeding direction decision processing are the same as those of the first example shown in FIG. 15, but a difference from the first example is that the second example does not include the processing in connection with disliked colors.

When a proceeding direction of the animal is decided corresponding to a surrounding color by the proceeding direction decision processing of Step S170, the speed setting/animal reversing processing is conducted (step S171). The speed setting/animal reversing processing will be detailed with reference to FIG. 28.

In the speed setting/animal reversing processing, first, a speed is decided based on a turning direction decided by the proceeding direction decision processing to give horizontal and vertical speed components (step S181). Because animals have different moving speeds, moving speeds are read from a speed conversion table, and horizontal and vertical speed components are given based on the moving speed of the animal and a turning direction.

Then, it is judged whether or not a current proceeding direction agrees with a horizontal direction of an image of a current animal (step S182). As images of respective animals, left directed images and right directed images of the respective animals are prepared in advance. When a horizontal component of a speed is directed left, the left directed image of the animal is displayed, and the right directed image of the animal is displayed when a horizontal component of a speed is directed right. In Step S182, it is judged whether or not a direction of an image of the animal agrees with the proceeding direction.

When it is judged that a current proceeding direction of the animal does not agree with a direction of an image of the animal, the reverse prohibition timer is decreased (step S183), and it is judged whether or not the reverse prohibition timer is at zero (step S184). When the reverse prohibition timer is at zero, an image of the animal is changed to a direction in which the image of the animal is replaced by an image thereof which agrees with the current proceeding direction (step S185).

When it is judged in Step 182 that a current proceeding direction agrees with a horizontal direction of an image of the animal, the reverse prohibition timer is initialized (step S186). Then the movement boundary check processing follows.

When it is judged in Step 184 that the reverse prohibition timer is at zero, the next movement boundary check processing proceeds.

Subsequently, the movement boundary check processing, for reversing the animal on an edge of the screen, follows (step S72). Details of the movement boundary check processing are the same as those of the movement boundary check processing of the first example shown in FIG. 16 and are not repeated here.

When the next coordinates are finally decided by the movement boundary processing in Step S72, the processing in Step S173 and the following steps in FIG. 27 follow.

First, the processing of changing an image of the animal, based on surrounding color information, is conducted.

First, with reference to the color information work memory prepared in the proceeding direction decision processing in Step S170, the number of dots of a color the animal likes which are present in the surroundings is counted. Then, for example, it is judged whether or not 46 or more dots are present (step S173). When 46 or more dots are present, an image of the animal is changed (step S174).

Figure 31:
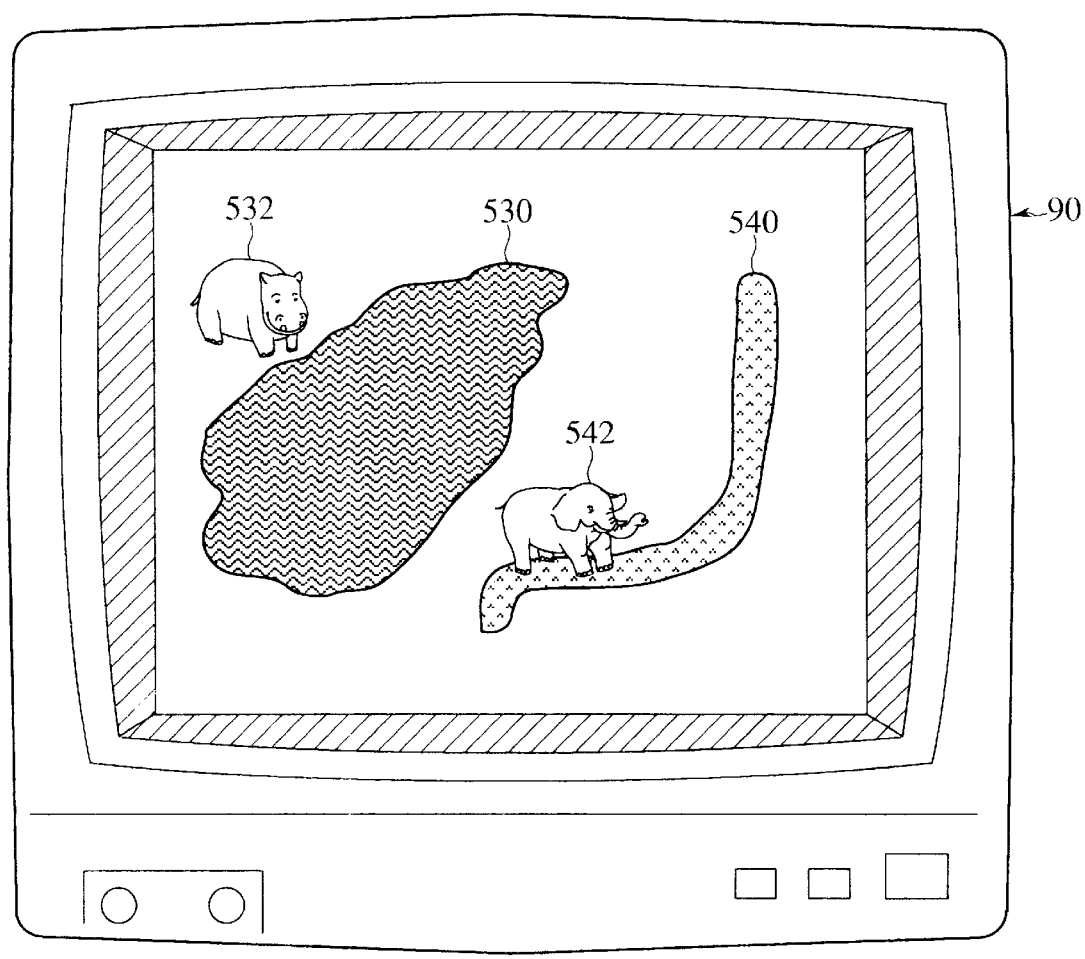
FIG. 31 is a view of one example of pictures on the canvas of the second example of the video game.
Figure 32:
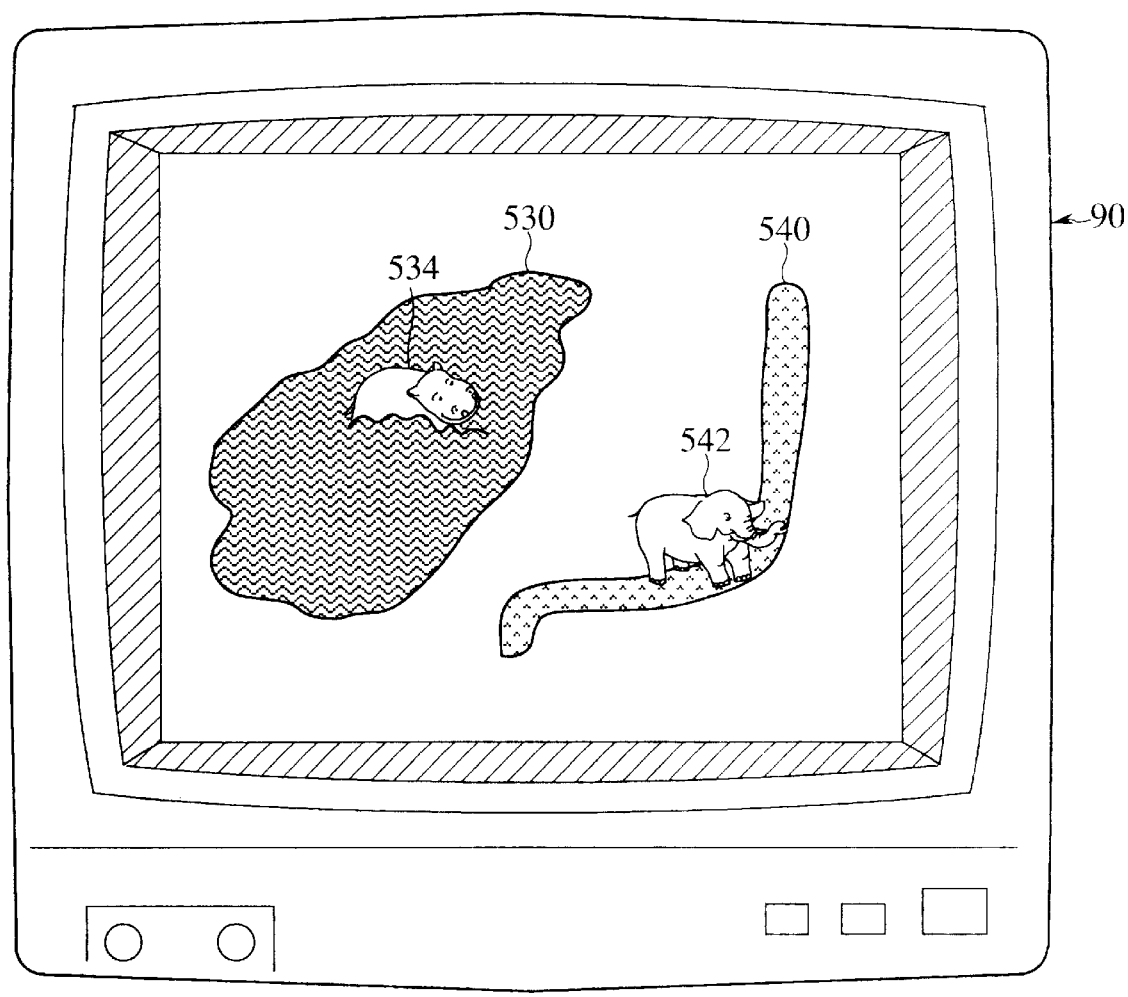
FIG. 32 is a view of one example of pictures on the canvas of the second example of the video game.

In a case of, e.g., a hippopotamus, it is judged that if the animal is surrounded by a liked color, light blue 530, the animal is in water, and an image 532 of the walking hippopotamus as shown in FIG. 31 is changed to a an image of a swimming image 534 of the hippopotamus. As shown in FIG. 32, the image 534 of the hippopotamus looks as if swimming in water 530. In cases of other animals, images of the animals are changed when they are surrounded by their liked colors, whereby their images can be displayed realistically.

Then, processing is conducted to rest the animal for a prescribed period of time. The movement of the animal pauses for every prescribed period of time, and an image of the resting animal is displayed. After the prescribed period of rest time, the animal resumes movement. Periods of rest time are set in advance for respective animals. Periods of time of a rest time timer are different depending on the animals.

First, it is judged whether or not it is a rest time (step S175). When it is a rest timing, an image of the resting animal is displayed (step S176). Unless it is a rest time, the processing proceeds to step S178.

Then, it is judged whether or not the rest time timer for counting a rest period of time is at zero (step S177). When the rest time timer is at zero, an image of the animal which has finished the rest is displayed (step S180).

Next, an image of the animal is clicked to conduct processing of making sounds of its voice. The touch pen 28 is operated to position the cursor on the animal on the screen and is clicked. An image of the animal changes and makes sounds.

First, it is judged whether or not the cursor is on the animal, and the touch pen 28 has been clicked (step S178). When the touch pen 18 is clicked, an image of the animal making sounds is displayed, and the sounds are made (step S179).

(Disappearance Processing)

Figure 29:
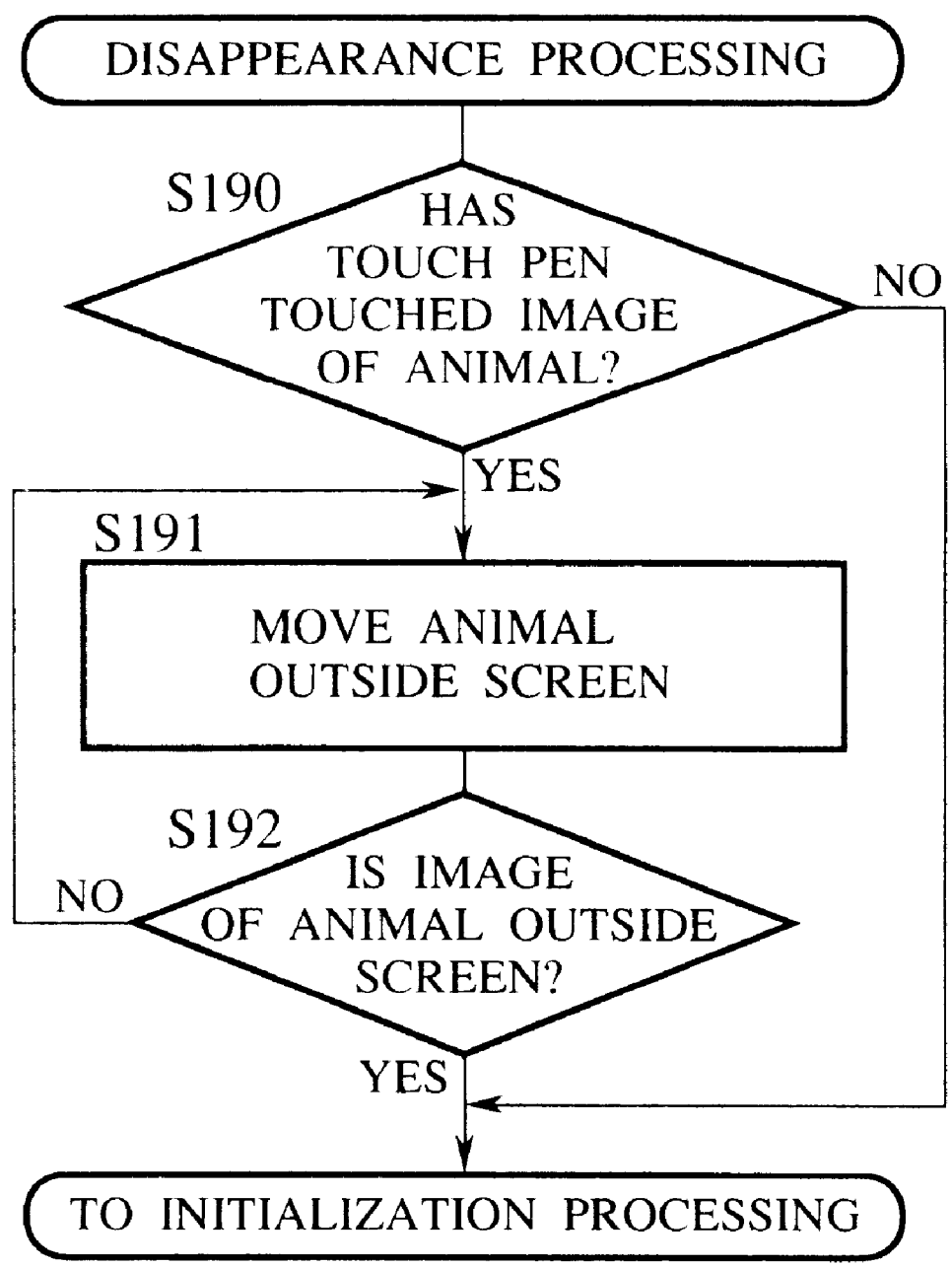
FIG. 29 is a flow chart of disappearance processing of the second example of the video game.

FIG. 29 shows the flow chart of the disappearance processing.

First, it is judged whether or not the picture of the animal in the picture book has been touched by the touch pen 28 (step S190). When the touch pen 28 touched nowhere or touched a part other than a position of the animal picture, the processing is returned to the initialization processing (step S130) to repeat the above-described processing.

When the touch pen 28 touches the animal picture, the disappearance processing, for causing the displayed image of the animal to disappear outside the screen, follows. The animal image is moved to a prescribed position outside the screen (step S191). Subsequently it is judged whether or not the animal has disappeared outside the screen (step S192). When the animal image is not from the screen, the processing is returned to step S191. When the animal image is outside the screen, the processing is returned to the initialization processing (step S130) to repeat the above-described processing.

Thus, in accordance with commands of a game player, an animal is caused to appear and is moved corresponding to color information of drawn pictures; images of the animal are changed; and the animal is caused to rest, make sounds and have other actions, whereby various games can be played.

The present invention is not limited to the above-described embodiment and covers other various modifications.

For example, in the above-described embodiment, an infant video game device is described, but the present invention is applicable to game devices of other constitutions.

Further, the present invention is applicable to an electronic tablet for electrically drawing pictures other than the game devices.

Furthermore, the present invention is universally applicable to game programs for universal computers, such as personal computers, etc., and image processing, such as image programs, etc.

INDUSTRIAL APPLICABILITY

The present invention is suitable for video game device for playing games using monitor screens, especially for infant video game devices for playing games using pictures drawn on monitor screens by game players.

We claim:

1. An image processing method for drawing a picture with a plurality of colors on a monitor screen, comprising the steps of:
   displaying an indication body which shows a sound manking status corresponding to a position on a picture commanded in response to position commands;
   displaying color information of said picture at said position;
   reading said color information; and
   emitting sounds corresponding to the color information being read.

2. An image processing method for drawing a picture with a plurality of colors on a monitor screen, said method comprising the steps of:
   setting a timbre in advance in response to timbre commands;
   displaying an indication body showing specific timbre sound making status corresponding to a position commanded in response to position commands,
   displaying color information of said picture at a position where said indication body is displayed;
   reading said color information of said picture; and
   emitting sounds of a frequency corresponding to the read color information being made in the set timbre.

3. An image processing method for drawing a picture with a plurality of colors on a monitor screen, said method comprising the steps of:

displaying a movable body corresponding to generated color information displayed on a monitor screen, moving said movable body on said monitor screen along the generated color information.

4. An image processing method for drawing a picture with a plurality of colors on a monitor screen, said method comprising the steps of:

generating a commandable movable body;

changing an image of said movable body when at least part of the color information surrounding said movable body is associated with said movable body.

5. An electronic device for drawing a picture with a plurality of colors on a monitor screen, comprising:

an input device for commanding an arbitrary position on the monitor screen;

a display device for displaying an indication body showing sound making status corresponding to the position commanded by the input device; and a sound maker for reading color information of said picture displayed at the position where the indication body is displayed and making sounds corresponding to the read color information.

6. The electronic device of claim 5, wherein said input device is a touch pen.

7. The electronic device of claim 5, wherein said display device includes at least one processor.

8. The electronic device of claim 5, wherein said sound maker includes at least an audio synthesizing circuit.

9. An electronic device for drawing a picture with a plurality of colors on monitor screen comprising:

an input device for commanding an arbitrary position on the monitor screen;

a display device for displaying an indication body showing specific timbre sound making status corresponding to the position commanded by said input device, the specific timbre being set in advance by said input device; and a sound maker for reading color information of a picture displayed at a position where said indication body is displayed and making sounds of a frequency corresponding to color information.

10. The electronic device of claim 9, wherein said input device is a touch pen.

11. The electronic device of claim 9, wherein said display device includes at least one processor.

12. The electronic device of claim 9, wherein said sound maker includes at least an audio synthesizing circuit.

13. An electronic device for drawing a picture with a plurality of colors on a monitor screen, comprising;

an image generator for generating a movable body image corresponding to color information displayed on a monitor screen and generating the movable body image so as to move the same on the monitor screen responsive to the color information.

14. An electronic device according to claim 13, further comprising:

a direction deciding unit for reading color information in an area surrounding a movable body and deciding a direction which has the most color information associated with the movable body, said image generator drawing the movable body so as to move in the direction decided by said direction deciding unit.

15. The electronic device of claim 14, wherein said direction deciding unit includes at least one processor.

16. The electronic device of claim 13, wherein said image generator includes at least one processor.

17. An electronic device for drawing a picture with a plurality of colors on a monitor screen, comprising:

an image generator for generating a movable body of a commanded kind and for changing an image of said movable body when at least part of the color information surrounding said movable body is associated with said movable body.

18. An information storage medium to be mounted on electronic devices according to any one of claims 5,9,13,14 or 17 comprising:

a picture book unit in which pictures to be commanded by an input device are drawn.

19. The information storage medium of claim 18, wherein said picture book unit is a cartridge.

20. The electronic device of claim 17, wherein said image generator includes at least one processor.

21. An image processing method for displaying an indication body with a plurality of colors on a monitor screen, said method comprising the steps of:

changing a first image of an indication body into a second image of the indication body responsive to a change in color information surrounding the indication body.

22. An image processing method for displaying an indication body with a plurality of colors on a monitor screen, said method comprising the steps of:

eliminating an indication body from a monitor screen when color informatiom associated with said indication body does not exist surrounding said indication body.

23. An image processing method for displaying an indication body with a plurality of colors on a monitor screen, said method comprising the steps of:

moving an indication body on a monitor screen responsive to color information surrounding said indication body.

24. An image processing method for displaying an indication body with a plurality of colors on a monitor screen, said method comprising the steps of:

moving an indication body along color information corresponding to said indication body.

25. An electronic device for displaying an indication body with a plurality of colors on a monitor screen, comprising:

a drawing circuit for drawing an image of an indication body so as to be changed into another image of said indication body responsive to a change in color information surrounding said indication body.

26. The electronic device of claim 25, wherein said drawing circuit includes at least one processor.

27. An electronic device for displaying an indication body with a plurality of colors on a monitor screen, comprising:

a drawing circuit for drawing an indication body so as to be eliminated from a monitor screen when color information corresponding to said indication body does not exist surrounding said indication body.

28. The electronic device of claim 27, wherein said drawing circuit includes at least one processor.

29. An electronic device for displaying an indication body with a plurality of colors on a monitor screen, comprising:

a drawing circuit for drawing an indication body so as to move said indication body on a monitor screen responsive to color information surrounding said indication body.

30. The electronic device of claim 29, wherein said drawing circuit includes at least one processor.

31. An electronic device for displaying an indication body with a plurality of colors on a monitor screen, comprising:

a drawing circuit for drawing an indication body so as to move said indication body along color information corresponding to said indication body.

32. The electronic device of claim 31, wherein said drawing circuit includes at least one processor.

33. An electronic device comprising;
   a display device for displaying a picture with a plurality of colors on a monitor screen;
   an input device for commanding an arbitrary position on said monitor screen; and
   a mounting portion for mounting a picture book-type cartridge, said picture book-type cartridge having an area for drawing the picture on said monitor screen and for specifying a function of said input device, said display device displaying a picture showing the function specified based on said area of said picture book on the monitor screen, wherein said display device displays an indication body showing sound malting status corresponding to a position commanded by said input device; and
   a sound maker for reading color information of said picture displayed at the position where the indication body is displayed and making sounds corresponding to the read color information.

34. The electronic device of claim 33, wherein said input device is a touch pen.

35. The electronic device of claim 33, wherein said display device includes at least one processor.

36. The electronic device of claim 33, wherein said sound maker includes at least an audio synthesizing circuit.

37. An electronic device comprising:
   a display device for displaying a picture with a plurality of colors on a monitor screen;
   an input device for commanding an arbitrary position on the monitor screen; and
   a mounting portion for mounting a picture book-type cartridge, said picture book-type cartridge having an area for drawing the picture on the monitor screen and for specifying a function of said input device, said display device displaying a picture showing the function specified based on said area of said picture book-type cartridge commanded by said input device on the monitor screen, said display device displays an indication body showing specific timbre sound making status corresponding to a position commanded by said input device, the specific timbre being set in advance by said input device; and
   a sound makers for reading color information of said picture displayed at the position where said indication body is displayed and making sounds of a frequency corresponding to the read color information.

38. The electronic device of claim 37, wherein said display device includes at least one processor.

39. The electronic device of claim 37, wherein said sound maker includes at least an audio synthesizing circuit.

40. The electronic device of claim 37, wherein said input device is a touch pen.

41. An electronic device comprising:
   a display device for displaying a picture with a plurality of colors on a monitor screen;
   an input device for commanding an arbitrary position on the monitor screen; and
   a mounting portion for mounting a picture book-type cartridge, said picture book-type cartridge having an area for drawing the picture on the monitor screen and for specifying a function of said input device, said display device displaying a picture showing the function specified based on the area of said picture book-type cartridge commanded by said input device on the monitor screen; and
   an image generator for generating a movable body image corresponding to color information displayed on the monitor screen and drawing said movable body image so as to move the same on the monitor screen responsive to the color information.

42. An electronic device according to claim 41, further comprising:
   a direction deciding unit for reading color information in a surrounding area of said movable body and deciding a direction which has the most color information associated with said movable body, said image generator for drawing the movable body so as to move in the direction decided by said direction deciding unit.

43. The electronic device of claim 41, wherein said input device is a touch pen.

44. The electronic device of claim 42, wherein said direction deciding unit includes at least one processor.

45. An electronic device comprising:
   a display device for displaying a picture with a plurality of colors on a monitor screen;
   an input device for commanding an arbitrary position an the monitor screen;
   a mounting portion for mounting a picture book-type cartridge, said picture book-type cartridge having an area for drawing the picture on the monitor screen and for specifying a function of said input device, said display device displaying a picture showing the function specified based on said area of the picture book-type cartridge commanded by said input device on the monitor screen; and
   an image generator for generating a movable body of a commanded kind and changing an image of said movable body when at least part of the color information surrounding said movable body is associated with said movable body.

46. The electronic device of claim 45, wherein said input device is a touch pen.

47. An electronic device comprising:
   a display device for displaying a picture with a plurality of colors on a monitor screen;
   an input device for commanding an arbitrary position on the monitor screen;
   a mounting portion for mounting a picture book-type cartridge, said picture book-type cartridge having an area for drawing the picture on the monitor screen and for specifying a function of said input device, said display device displaying a picture showing the function specified based on said area of said picture book-type cartridge commanded by said input device on the monitor screen; and
   an image generator for generating an image of an indication body so as to change the image of said indication body based on color information surrounding said indication body on the monitor screen.

48. The electronic device of claim 47, wherein said input device is a touch pen.

49. An electronic device comprising:
   a display device for displaying a picture with a plurality of colors on a monitor screen;
   an input device for commanding an arbitrary position on the monitor screen;
   a mounting portion for mounting a picture book-type cartridge, said picture book-type type cartridge having an area for drawing the picture on the monitor screen and for specifying a function of said input device, said display device displaying a picture showing the function specified based on said area of said picture book-type cartridge commanded by said input device on the monitor screen; and an image generator for drawing an indication body so as to be eliminated from the monitor screen when color information with reference to said indication body does not exist surrounding said indication body.

50. The electronic device of claim 49, wherein said input device is a touch pen.

51. An electronic device comprising:

a display device for displaying a picture with a plurality of colors on a monitor screen;

an input device for commanding an arbitrary position on the monitor screen;

a mounting portion for mounting a picture book-type cartridge, said picture book-type type cartridge having an area for drawing the picture on the monitor screen and for specifying a function of said input device, said display device displaying a picture showing the function specified based on said area of said picture book-type cartridge commanded by said input device on the monitor screen; and an image generator for drawing an indication body so as to move said indication body on the monitor screen based on color information surrounding said indication body.

52. The electronic device of claim 51, wherein said input device is a touch pen.

53. An electronic device comprising:

a display device for displaying a picture with a plurality of colors on a monitor screen;

an input device for commanding an arbitrary position on the monitor screen;

a mounting portion for mounting a picture book-type cartridge, said picture book-type cartridge having an area for drawing the picture on the monitor screen and for specifying a function of said input device, said display device displaying a picture showing the function specified based on said area of said picture book-type cartridge commanded by said input device on the monitor screen; and an image generator for drawing an indication body so as to move said indication body along color information corresponding to said indication body.

54. The electronic device of claim 53, wherein said input device is a touch pen.

\* \* \* \* \*